United States Patent
Kawakami

(10) Patent No.: US 9,854,531 B2
(45) Date of Patent: Dec. 26, 2017

(54) INTEGRATED CIRCUIT SYSTEM AND INTEGRATED CIRCUIT

(71) Applicant: FUJITSU LIMITED, Kawasaki-shi, Kanagawa (JP)

(72) Inventor: Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/436,751

(22) Filed: Feb. 17, 2017

(65) Prior Publication Data

US 2017/0265143 A1 Sep. 14, 2017

(30) Foreign Application Priority Data

Mar. 14, 2016 (JP) ................................ 2016-049404

(51) Int. Cl.
| | | |
|---|---|---|
| H04M 1/00 | (2006.01) | |
| H04B 1/28 | (2006.01) | |
| H04W 24/00 | (2009.01) | |
| H04W 52/02 | (2009.01) | |
| H04W 56/00 | (2009.01) | |
| H04W 4/00 | (2009.01) | |

(52) U.S. Cl.
CPC ..... *H04W 52/0274* (2013.01); *H04W 56/001* (2013.01); *H04W 4/005* (2013.01)

(58) Field of Classification Search
CPC ............. H04W 4/005; H04W 52/0274; H04W 56/001; H01L 21/82
USPC ............ 455/333, 343, 1, 423, 574; 340/501, 340/539.1
See application file for complete search history.

(56) References Cited

U.S. PATENT DOCUMENTS

| | | | | |
|---|---|---|---|---|
| 7,046,573 | B2 * | 5/2006 | Takazawa | G11C 5/14 365/203 |
| 7,080,341 | B2 * | 7/2006 | Eisenstadt | G06F 17/505 326/81 |
| 7,991,921 | B2 * | 8/2011 | Fischer | G06F 1/3203 710/15 |
| 8,676,117 | B2 * | 3/2014 | Dokai | G06K 19/07749 455/333 |
| 9,442,556 | B2 * | 9/2016 | Joo | G06F 1/06 |

(Continued)

FOREIGN PATENT DOCUMENTS

| | | |
|---|---|---|
| JP | 63-036350 | 2/1988 |
| JP | 01-251148 | 10/1989 |
| JP | 09-073345 | 3/1997 |

*Primary Examiner* — Quochien B Vuong
(74) *Attorney, Agent, or Firm* — Fujitsu Patent Center

(57) ABSTRACT

An integrated circuit system includes a first integrated circuit for which signal modes set to a plurality of first I/O ports in the active mode are maintained in the sleep mode and a second integrated circuit for which a plurality of second I/O ports are placed in a floating state in the sleep mode, wherein the first integrated circuit transmits a first notification signal that indicates an operation mode to the second integrated circuit, wherein the second integrated circuit transmits a second notification signal that indicates an operation mode to the first integrated circuit, and wherein the signal modes of the plurality of first I/O ports and the plurality of second I/O ports are set such as to suppress steady currents persistently flowing between the first I/O ports and the second I/O ports, and to suppress through currents flowing.

9 Claims, 26 Drawing Sheets

(56) References Cited

U.S. PATENT DOCUMENTS

2006/0172719 A1* 8/2006 Chen .................. H04B 1/38
455/333

* cited by examiner

FIG.4

| OPERATION MODE | OUTPUT ENABLE OE | INPUT ENABLE IE | PULLUP ENABLE PUE | PULLDOWN ENABLE PDE |
|---|---|---|---|---|
| PUSH-PULL OUTPUT | On | Off | Off | Off |
| PUSH-PULL INPUT | Off | On | Off | Off |
| PULLUP INPUT (OPEN DRAIN INPUT) | Off | On | On | Off |
| PULLDOWN INPUT (OPEN SOURCE INPUT) | Off | On | Off | On |
| HIGH IMPEDANCE | Off | Off | Off | Off |

FIG.5

| | | I/O PORT B | | | | | |
|---|---|---|---|---|---|---|---|
| | | PUSH-PULL OUTPUT (OUTPUT VOLTAGE = VDD) | PUSH-PULL OUTPUT (OUTPUT VOLTAGE = 0) | PUSH-PULL INPUT | PULLUP INPUT | PULLDOWN INPUT | HIGH IMPEDANCE |
| I/O PORT A | PUSH-PULL OUTPUT (OUTPUT VOLTAGE = VDD) | OK | NG | OK | OK | NG | OK |
| | PUSH-PULL OUTPUT (OUTPUT VOLTAGE = 0) | NG | OK | OK | NG | OK | OK |
| | PUSH-PULL INPUT | OK | OK | NG | OK | OK | NG |
| | PULLUP INPUT | OK | NG | OK | OK | NG | OK |
| | PULLDOWN INPUT | NG | OK | OK | NG | OK | OK |
| | HIGH IMPEDANCE | OK | OK | NG | OK | OK | OK |

FIG.6

| POWER SUPPLY CONDITION | | SIGNAL FROM IC1 TO IC2 | | | | SIGNAL FROM IC2 TO IC1 | | | |
|---|---|---|---|---|---|---|---|---|---|
| IC1 | IC2 | MODE OF I/O PORT 101 OF IC1 | MODE OF I/O PORT 202 OF IC2 | MODE OF I/O PORT 111 OF IC1 | MODE OF I/O PORT 212 OF IC2 | MODE OF I/O PORT 102 OF IC1 | MODE OF I/O PORT 201 OF IC2 | MODE OF I/O PORT 112 OF IC1 | MODE OF I/O PORT 211 OF IC2 |
| ACTIVE | ACTIVE | PUSH-PULL OUTPUT | PUSH-PULL INPUT | FIXED MODE (OV=AN) | PUSH-PULL INPUT OR FIXED INPUT MODE (OV=AN) | PUSH-PULL INPUT | PUSH-PULL OUTPUT | PUSH-PULL INPUT OR FIXED INPUT MODE (OV=AN) | FIXED MODE (OV=AN) |
| ACTIVE | SLEEP | FIXED MODE | HIGH IMPEDANCE | FIXED MODE (OV=AN) | HIGH IMPEDANCE | FIXED MODE | HIGH IMPEDANCE | FIXED INPUT MODE (OV=SN) | HIGH IMPEDANCE |
| SLEEP | SLEEP | FIXED MODE | HIGH IMPEDANCE | FIXED MODE (OV=SN) | HIGH IMPEDANCE | FIXED MODE | HIGH IMPEDANCE | FIXED INPUT MODE (OV=SN) | HIGH IMPEDANCE |
| SLEEP | ACTIVE | FIXED MODE | MODE NOT INCON- SISTENT WITH 101 | FIXED MODE (OV=SN) | PUSH-PULL INPUT OR FIXED INPUT MODE (OV=SN) | FIXED MODE | MODE NOT INCON- SISTENT WITH 102 | FIXED INPUT MODE (OV=SN) | FIXED MODE (OV=SN) |

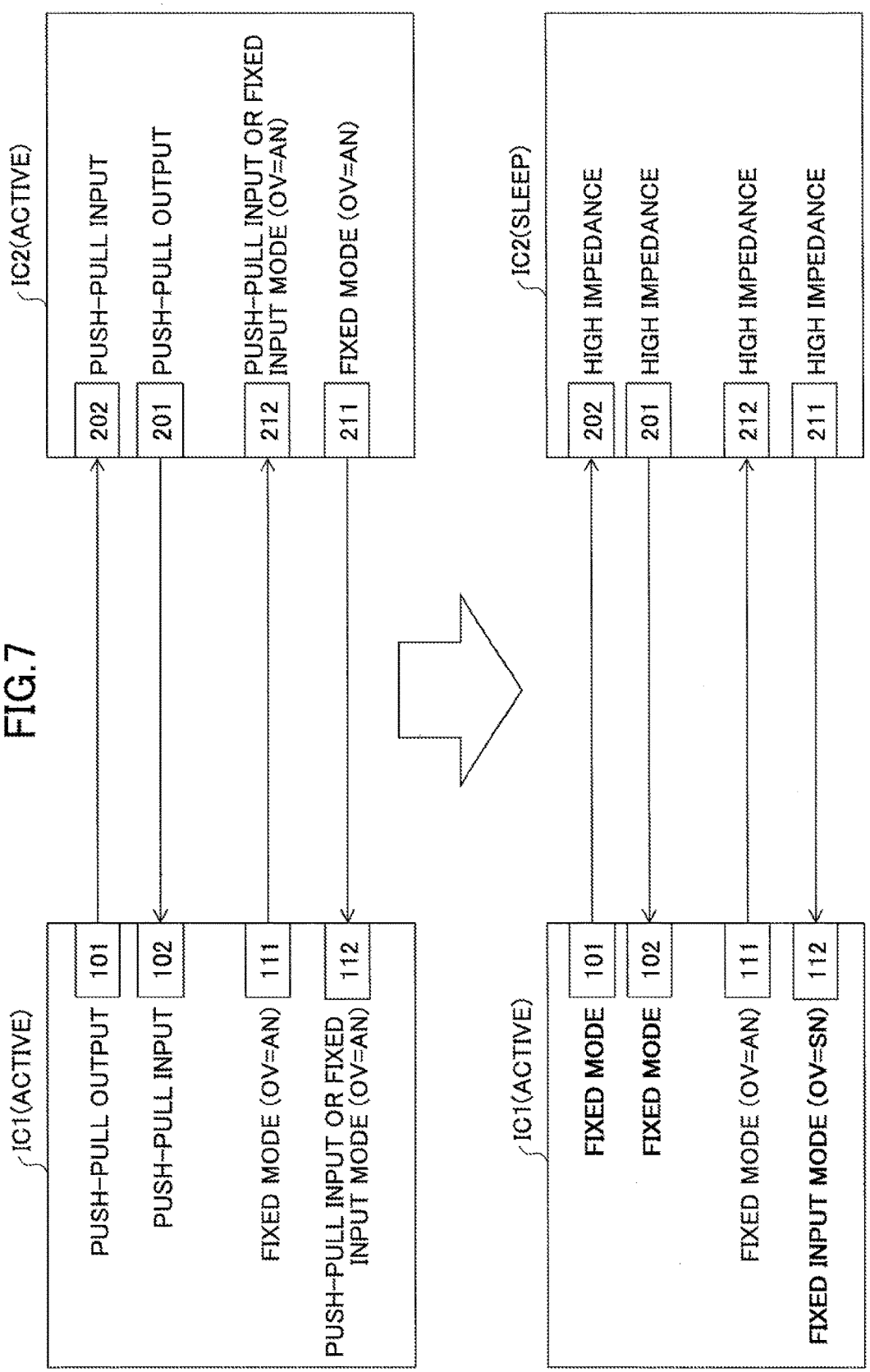

INTEGRATED CIRCUIT SYSTEM AND INTEGRATED CIRCUIT

CROSS-REFERENCE TO RELATED APPLICATIONS

The present application is based upon and claims the benefit of priority from the prior Japanese Patent Application No. 2016-049404 filed on Mar. 14, 2016, with the Japanese Patent Office, the entire contents of which are incorporated herein by reference.

FIELD

The disclosures herein generally relate to an integrated circuit system and an integrated circuit.

BACKGROUND

In recent years, power generation efficiency has been improved with respect to energy harvesting devices such as solar batteries, thermoelectric generators, or vibration-powered generators, which generate electric power from ambient energy. MCUs (micro-control units) operable with minute electric power have also been developed. An MCU and an energy harvester may be combined to implement an embedded device that is cable of operating without receiving power from an external source. One of the applications of such embedded devices may be a wireless sensor node. The realization of a wireless sensor node capable of operating without receiving electric power allows a wireless sensor node to be installed in an unsafe high place, a place where toxic gas is present, a place where temperature and humidity are unbearable for men, etc., without the need for manual replacement of a battery, and is thus extremely useful.

Despite the improvement of power generation efficiency, the power consumption of an MCU used in an embedded device needs to be reduced as much as possible in order to allow the embedded device to operate with the limited power derived by an energy harvester. In a wireless sensor node, the length of an idle state that is a waiting state preceding the start of a next operation is extremely long, compared with the length of an active state during which a sensing operation, a wireless communication, and so on are performed. In the case of such an embedded device, reducing power consumption in idle states, i.e., in sleep modes, is an important factor to be considered in order to reduce the average of total power consumption. Reducing the MCU's power consumption in a sleep mode involves setting appropriate signal input and output modes to its I/O ports so as to reduce electric currents flowing between these I/O ports and another IC.

Integrated circuits available today such as MCUs designed to have low power consumption include those which allow the signal input and output modes of its I/O ports to be freely set according to software-based control or the like. Each of the I/O ports of such an integrated circuit is provided with a plurality of signal input and output modes, one of which is selected and set according to control by software or the like operating in the integrated circuit. The signal input and output mode set to an I/O port during the active mode according to control by software or the like stays unchanged even after a transition is made from the active mode to the sleep mode. On the other hand, a normal integrated circuit that is not specifically designed as the low power integrated circuit as described above has an I/O port that is automatically set to a high-impedance state in the sleep mode.

Connecting the normal integrated circuit and the low power integrated circuit through their I/O ports with each other results in the flow of needless steady current unless the I/O ports are set to proper signal input and output modes by taking into account various combinations among the active mode and the sleep mode.

[Patent Document 1] Japanese Laid-open Patent Publication No. S63-36350

[Patent Document 2] Japanese Laid-open Patent Publication No. H1-251148

SUMMARY

According to an aspect of the embodiment, an integrated circuit system includes a first integrated circuit having a plurality of first I/O ports and configured to operate in an operation mode that is at least either an active mode or a sleep mode, the plurality of first I/O ports being configured to transmit or receive signals based on first signal modes which are set to the plurality of first I/O ports, the first signal modes set to the plurality of first I/O ports in the active mode being maintained in the sleep mode; and a second integrated circuit having a plurality of second I/O ports coupled to the plurality of first I/O ports, and configured to operate in an operation mode that is at least either an active mode or a sleep mode, the plurality of second I/O ports being configured to transmit or receive signals based on second signal modes set to the plurality of second I/O ports, the second signal modes set to the plurality of second I/O ports in the active mode being not maintained in the sleep mode, and the plurality of second I/O ports being placed in a floating state in the sleep mode, wherein the first integrated circuit transmits, from one of the plurality of first I/O ports to the second integrated circuit, a first notification signal that indicates an operation mode of the first integrated circuit, the second integrated circuit transmits, from one of the plurality of second I/O ports to the first integrated circuit, a second notification signal that indicates an operation mode of the second integrated circuit, and in response to the received second notification signal and the received first notification signal, the first integrated circuit sets the first signal modes of the plurality of first I/O ports, and the second integrated circuit sets the second signal modes of the plurality of second I/O ports, to suppress steady currents persistently flowing between the first I/O ports and the second I/O ports, and to suppress through currents flowing at any one of the first I/O ports and the second I/O ports.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a drawing illustrating the settings of enable signals used to set each signal input and output mode;

FIG. 5 is a drawing illustrating a table that lists proper combinations and improper combinations of signal input and output modes between the two I/O ports that are connected to each other;

FIG. 6 is a drawing illustrating a table that lists proper signal input and output modes for the I/O ports with respect to each combination of operation modes of the two integrated circuits connected to each other;

FIG. 7 is a drawing illustrating the case in which the second integrated circuit makes a transition to the sleep mode from the state in which both the first integrated circuit and the second integrated circuit are in the active mode;

DESCRIPTION OF EMBODIMENTS

In the following, embodiments of the invention will be described with reference to the accompanying drawings.

Figure 1:
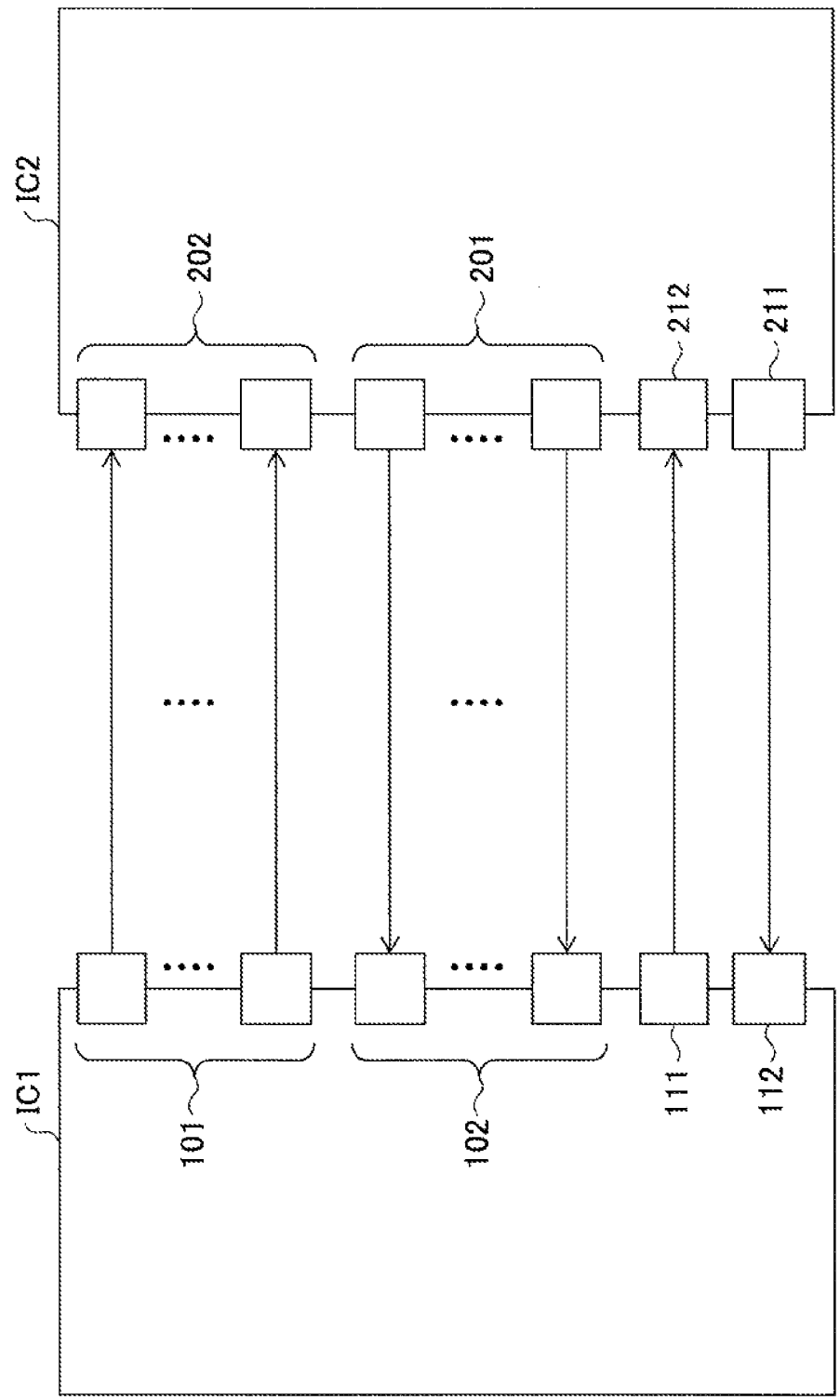
FIG. 1 is a drawing illustrating an example of the configuration of an integrated circuit system having a first integrated circuit and a second integrated circuit.

FIG. 1 is a drawing illustrating an example of the configuration of an integrated circuit system having a first integrated circuit IC1 and a second integrated circuit IC2. In FIG. 1, the first integrated circuit IC1, which is a low power integrated circuit such as the low power MCU previously described, has I/O ports whose signal input and output modes in the sleep mode are settable. The first integrated circuit IC1 includes a plurality of first I/O ports 101, 102, 111, and 112. The first integrated circuit IC1 operates in at least either one of an active mode and a sleep mode having lower power consumption than the active mode. Signal input and output modes set to the first I/O ports during the active mode are maintained in the sleep mode.

The second integrated circuit IC2, which is a normal integrated circuit such as the normal MCU previously described, has I/O ports that are placed in a floating state in the sleep mode. The second integrated circuit IC2 includes a plurality of second I/O ports 201, 202, 211, and 212. The second integrated circuit IC2 operates in at least either one of an active mode and a sleep mode having lower power consumption than the active mode. Signal input and output modes set to the second I/O ports during the active mode are not maintained in the sleep mode. The second I/O ports are placed in the floating state in the sleep mode.

In the example of connections illustrated in FIG. 1, the one or more first I/O ports 101 are used to transmit one or more signals from the first integrated circuit IC1 to the second integrated circuit IC2. The signals transmitted from the first I/O ports 101 are received by the second I/O ports 202, respectively. The number of first I/O ports 101 and the number of second I/O ports 202 are not limited to a particular number.

The one or more second I/O ports 201 are used to transmit one or more signals from the second integrated circuit IC2 to the first integrated circuit IC1. The signals transmitted from the second I/O ports 201 are received by the first I/O ports 102, respectively. The number of first I/O ports 102 and the number of second I/O ports 201 are not limited to a particular number.

The first integrated circuit IC1 transmits from the first I/O port 111 a first notification signal indicative of the operation mode of the first integrated circuit IC1 to the second integrated circuit IC2. The first notification signal transmitted from the first I/O port 111 is received by the second I/O port 212. The second integrated circuit IC2 transmits from the second I/O port 211 a second notification signal indicative of the operation mode of the second integrated circuit IC2 to the first integrated circuit IC1. The second notification signal transmitted from the second I/O port 211 is received by the first I/O port 112.

Figure 2:
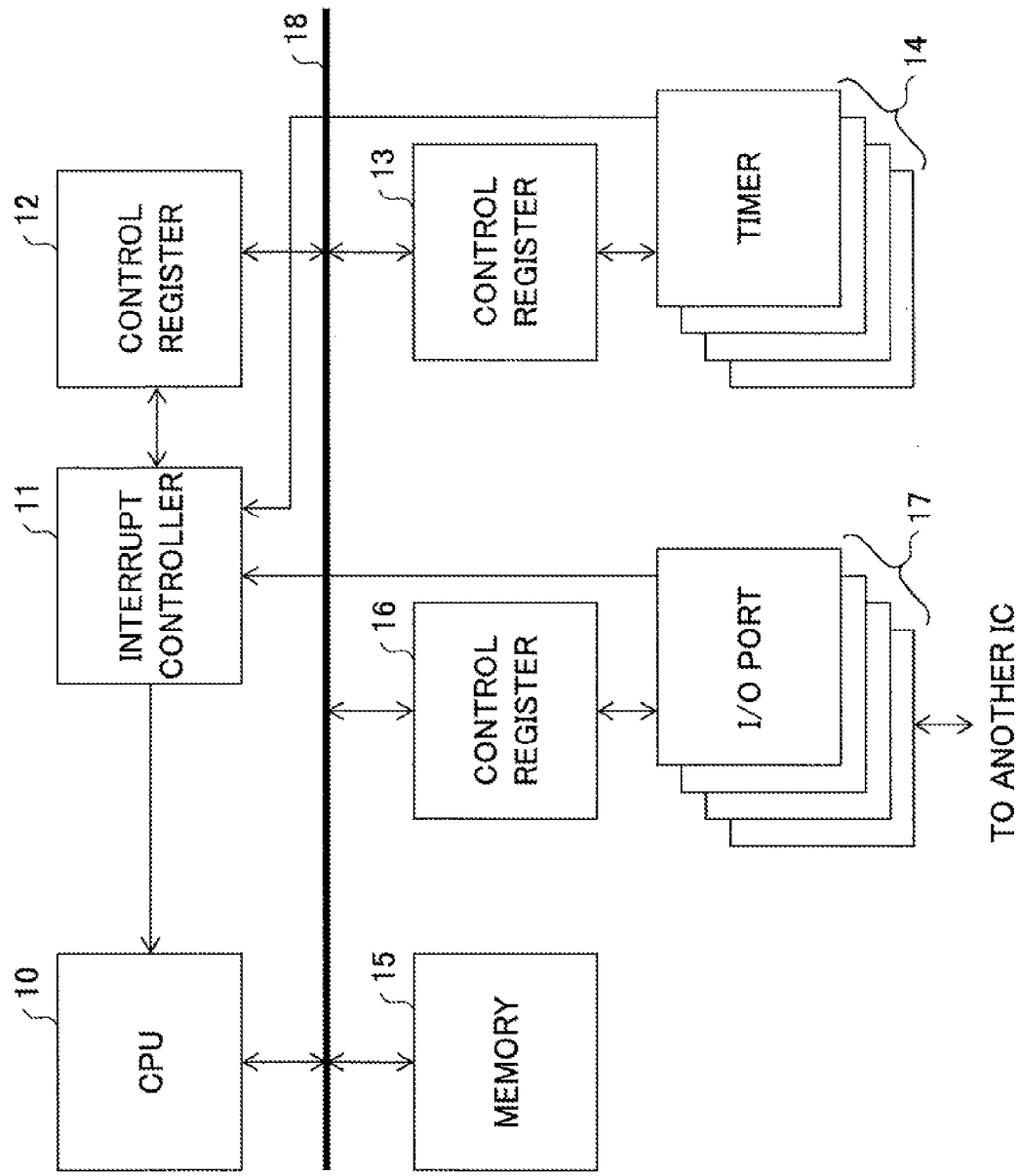
FIG. 2 is a drawing showing an example of the configuration of an integrated circuit.

FIG. 2 is a drawing showing an example of the configuration of an integrated circuit. The integrated circuit illustrated in FIG. 2 includes a CPU (central processing unit) 10, an interrupt controller 11, a control register 12, a control register 13, a timer 14, a memory 15, a control register 16, I/O ports 17, and a bus 18. The CPU 10, the control register 12, the control register 13, the memory 15, and the control register 16 are connected to the bus 18. The memory 15 may include ROM (read only memory) and a RAM (random access memory). The ROM of the memory 15 stores programs and data used for the basic operations of the integrated circuit. The CPU 10 executes the programs and refers to the data to implement desired operations. The RAM of the memory 15 is used as a work area for the CPU 10, and may also store programs loaded from an external source through the I/O ports 17. The CPU 10 may implement desired operations by executing the programs stored in the RAM.

The CPU 10, which functions as a control circuit, writes settings to the control register 16 to set signal input and output modes to the I/O ports 17. Specifically, the CPU 10 writes settings to the control register 16 to set the I/O ports 17 to one of a push-pull output mode, a push-pull input mode, a pullup input mode, a pulldown input mode, and a high-impedance mode.

The CPU 10 writes settings to the control register 12 to control the operation of the interrupt controller 11. Controlling the operation of the interrupt controller 11 in accordance with the settings stored in the control register 12 enables the control of interrupt priority, the timing of interrupting the CPU 10, etc. The interrupt controller 11 responds to an interrupt request from the timer 14 or an interrupt request from an external source through the I/O ports 17 to notify the CPU 10 of the interrupt signal. In response to the notification of the interrupt signal, the CPU 10 performs an interrupt action accordingly.

The CPU 10 writes settings to the control register 13 to control the operation of the timer 14. For example, writing data indicative of a predetermined time length to the control register 13 may cause the timer 14 to generate an interrupt request upon each occurrence of the passage of time equal to the time length indicated by the data. Such an interrupt function based on the timer 14 may be utilized to implement the operation of the integrated circuit illustrated in FIG. 2 to return from the sleep mode to the active mode at regular intervals.

Figure 3:
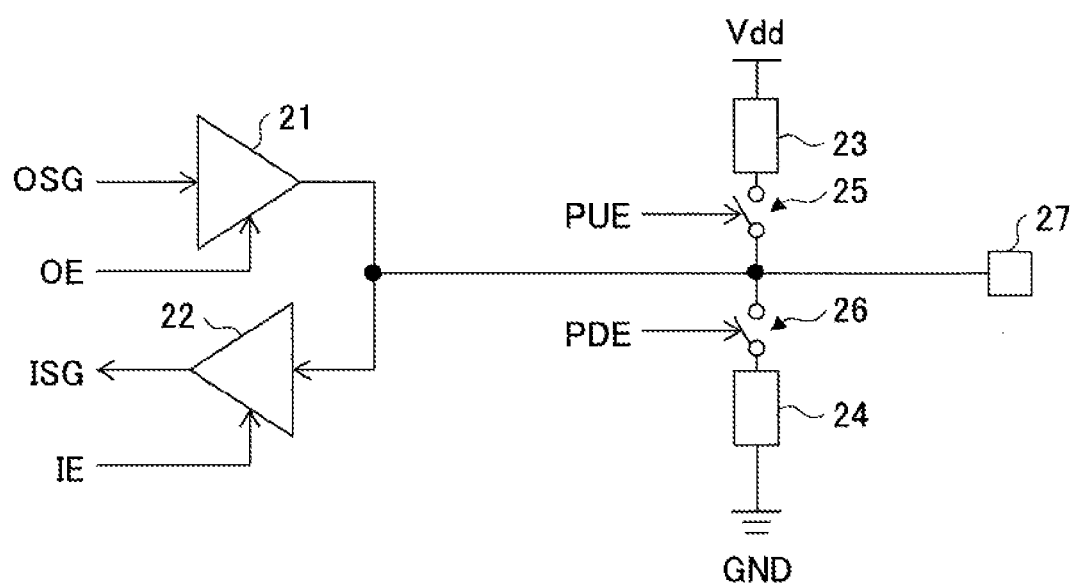
FIG. 3 is a drawing illustrating an example of the configuration of an I/O port.

FIG. 3 is a drawing illustrating an example of the configuration of an I/O port. Each of the I/O ports illustrated in FIG. 1 may have the configuration illustrated in FIG. 3. The I/O port illustrated in FIG. 3 includes an output buffer 21, an input buffer 22, a pullup resistor 23, a pulldown resistor 24, a switch circuit 25, a switch circuit 26, and a signal terminal 27. An output enable signal OE, an input enable signal IE, a pullup enable signal PUE, and a pulldown enable signal PDE illustrated in FIG. 3 may be supplied from the control register 16 illustrated in FIG. 2. In response to the settings stored in the control register 16, each enable signal is set to a desired signal level.

The output buffer 21 operates in response to the assertion of the output enable signal OE, and stops operating in response to the negation of the output enable signal OE. The input buffer 22 operates in response to the assertion of the input enable signal IE, and stops operating in response to the negation of the input enable signal IE. The switch circuit 25 becomes conductive in response to the assertion of the pullup enable signal PUE, and becomes nonconductive in response to the negation of the pullup enable signal PUE. The switch circuit 26 becomes conductive in response to the assertion of the pulldown enable signal PDE, and becomes nonconductive in response to the negation of the pulldown enable signal PDE. The I/O port illustrated in FIG. 3 is set to one of the push-pull output mode, the push-pull input mode, the pullup input mode, the pulldown input mode, and the high-impedance mode.

FIG. 4 is a drawing illustrating the settings of enable signals used to set each signal input and output mode. The output enable signal OE, the input enable signal IE, the pullup enable signal PUE, and the pulldown enable signal PDE are set as illustrated in FIG. 4 to place the I/O port in a desired signal input and output mode.

Specifically, the I/O port is placed in the push-pull output mode by setting only the output enable signal OE to the asserted state (i.e., ON) and setting the remaining enable signals to the negated state (i.e., OFF). In the push-pull output mode, the output buffer 21 generates a voltage level responsive to the signal value of an output signal OSG, thereby causing the signal terminal 27 to output this voltage level.

The I/O port is placed in the push-pull input mode by setting only the input enable signal IE to the asserted state (i.e., ON) and setting the remaining enable signals to the negated state (i.e., OFF). In the push-pull input mode, the input buffer 22 generates an input signal ISG responsive to the voltage level that is applied to the signal terminal from an external source. When the I/O port of another integrated circuit connected to the signal terminal 27 is set to the floating state, the voltage of the signal terminal 27 may be set to a middle voltage that is neither high nor low, which may cause a through current to flow through the input buffer 22. More specifically, the PMOS transistor and the NMOS transistor constituting the CMOS circuit of the input buffer 22 may both become conductive, which may cause a through current to flow from the power supply terminal to the ground terminal. The presence of such a through current creates large power consumption.

The I/O port is placed in the pullup input mode by setting only the input enable signal IE and the pullup enable signal PUE to the asserted state (i.e., ON) and setting the remaining enable signals to the negated state (i.e., OFF). In the pullup input mode, the signal terminal 27 is set to a high voltage (e.g., the power supply voltage) through the pullup resistor 23. Even when the I/O port of another integrated circuit connected to the signal terminal 27 is set to the floating state, thus, no through current flows through the input buffer 22. In the case of the I/O port of another integrated circuit producing a low output, however, the signal terminal 27 is set to a low voltage, resulting in a steady current flowing through the pullup resistor 23. Power consumption commensurate with such a current thus occurs. Here, the term "steady current" refers to an electric current that steadily flows through a current path formed between the power supply potential and the ground through a pullup resistor or the like. Unlike an electric current flowing into a parasitic capacitor, a constant current continues to flow as long as the current path exists.

The I/O port is placed in the pulldown input mode by setting only the input enable signal IE and the pulldown enable signal PDE to the asserted state (i.e., ON) and setting the remaining enable signals to the negated state (i.e., OFF). In the pulldown input mode, the signal terminal 27 is set to a low voltage (e.g., the ground voltage) through the pulldown resistor 24. Even when the I/O port of another integrated circuit connected to the signal terminal 27 is set to the floating state, thus, no through current flows through the input buffer 22. In the case of the I/O port of another integrated circuit producing a high-voltage output, however, the signal terminal 27 is set to a high voltage, resulting in a steady current flowing through the pulldown resistor 24. Power consumption commensurate with such a current thus occurs.

The I/O port is placed in the high-impedance mode (i.e., the floating state) by setting all the enable signals to the negated state (i.e., OFF). In the high-impedance mode, the signal terminal 27 is set in the floating state without being connected to any potential, so that the voltage level of the signal terminal 27 becomes undefined.

In the integrated circuit system illustrated in FIG. 1, the first integrated circuit IC1 and the second integrated circuit IC2 make settings to the first I/O ports and the second I/O ports, respectively, based on the second notification signal and the first notification signal that are respectively received, in order to avoid needless current flow. More specifically, the signal input and output modes of the first I/O ports and the second I/O ports are set such that no steady currents flow between the first I/O ports and the second I/O ports and such that no through current flows at any one of the first I/O ports and the second I/O ports.

FIG. 5 is a drawing illustrating a table that lists proper combinations and improper combinations of signal input and output modes between the two I/O ports that are connected to each other. In the table illustrated in FIG. 5, an I/O port A and an I/O port B are connected to each other.

With respect to each signal input and output mode of the I/O port A illustrated in a corresponding row of the table, a proper mode among the signal input and output modes of the I/O port B to be used in combination is designated as "OK" at a corresponding column, and an improper mode is designated as "NG" at a corresponding column. For example, when the I/O port A is the push-pull output mode and the output voltage is high (i.e., Vdd), the proper (i.e., "OK") modes for the I/O port B include the push-pull output mode (output voltage=Vdd), the push-pull input mode, the pullup input mode, and the high-impedance mode. In this case, the improper (i.e., "NG") modes for the I/O port B include the push-pull output mode (output voltage=0) and the pulldown input mode. In the case of the I/O port B being the push-pull output mode (output voltage=0), the push-pull output of the I/O port B and the push-pull output (output voltage=Vdd) of the I/O port A are conflicting output voltages, resulting in a through current flowing through the I/O ports A and B. In the case of the I/O port B being the pulldown input mode, a steady current flows from the push-pull output (output voltage=Vdd) of the I/O port A to the ground through the pulldown resistor 24 (see FIG. 3), which is undesirable.

In the integrated circuit system illustrated in FIG. 1, as previously described, the signal input and output modes of the first I/O ports and the second I/O ports are set such that no steady currents flow between the I/O ports, and such that no through currents flow through any I/O ports. More specifically, the first I/O ports and the second I/O ports connected to each other have the signal input and output modes assigned thereto such that the combinations of the assigned signal input and output modes correspond to those which are shown as being proper (i.e., "OK") in the table of FIG. 5.

FIG. 6 is a drawing illustrating a table that lists proper signal input and output modes for the I/O ports with respect to each combination of operation modes of the two integrated circuits connected to each other. In the table illustrated in FIG. 6, a signal-line-voltage fixed mode for an I/O port refers to a signal input and output mode in which the voltage of the signal terminal 27 of this I/O port is fixed so as to avoid a through current flowing through the input buffer 22 of this I/O port even when the setting of another terminal connected thereto is the high-impedance mode. Specifically, the signal-line-voltage fixed mode is one of the push-pull output mode, the pullup input mode, and the pulldown input mode.

A signal-line-voltage fixed mode (output voltage=active notification), which is one type of the signal-line-voltage fixed mode, is a signal input and output mode in which the signal terminal 27 is fixed to a voltage for active notification (i.e., a voltage for notifying an active mode). Specifically, in the case of the active notification being a high voltage (i.e., Vdd), the signal-line-voltage fixed mode (output voltage=active notification) is one of the push-pull output mode and the pullup input mode that produce a high output. In the case of the active notification being a low voltage (i.e., Gnd), the signal-line-voltage fixed mode (output voltage=active notification) is one of the push-pull output mode and the pulldown input mode that produce a low output.

A signal-line-voltage fixed mode (output voltage=sleep notification), which is one type of the signal-line-voltage fixed mode, is a signal input and output mode in which the signal terminal 27 is fixed to a voltage for sleep notification (i.e., a voltage for notifying a sleep mode). Specifically, in the case of the sleep notification being a high voltage (i.e., Vdd), the signal-line-voltage fixed mode (output voltage=sleep notification) is one of the push-pull output mode and the pullup input mode that produce a high output. In the case of the sleep notification being a low voltage (i.e., Gnd), the signal-line-voltage fixed mode (output voltage=sleep notification) is one of the push-pull output mode and the pulldown input mode that produce a low output.

A signal-line-voltage-fixed input mode (output voltage=active notification) is a signal input mode in which the signal terminal 27 is fixed to a voltage for active notification (i.e., a voltage for notifying an active mode). Specifically, in the case of the active notification being a high voltage (i.e., Vdd), the signal-line-voltage-fixed input mode (output voltage=active notification) is the pullup input mode. In the case of the active notification being a low voltage (i.e., Gnd), the signal-line-voltage-fixed input mode (output voltage=active notification) is the pulldown input mode.

A signal-line-voltage-fixed input mode (output voltage=sleep notification) is a signal input mode in which the signal terminal 27 is fixed to a voltage for sleep notification (i.e., a voltage for notifying a sleep mode). Specifically, in the case of the sleep notification being a high voltage (i.e., Vdd), the signal-line-voltage-fixed input mode (output voltage=sleep notification) is the pullup input mode. In the case of the sleep notification being a low voltage (i.e., Gnd), the signal-line-voltage-fixed input mode (output voltage=sleep notification) is the pulldown input mode.

In FIG. 6 and the subsequent drawings, the signal-line-voltage fixed mode is simply referred to as "FIXED MODE". The signal-line-voltage-fixed input mode is simply referred to as "FIXED INPUT MODE". The output voltage is denoted as "OV". The active notification and the sleep notification are denoted as "AN" and "SN", respectively.

In FIG. 6, the case in which both the first integrated circuit IC1 and the second integrated circuit IC2 are in the active mode is illustrated in the row at the top of the table. In this case, the first I/O ports 101 and the second I/O ports 202 connected to each other are set to the push-pull output mode and the push-pull input mode, respectively. Further, the first I/O ports 102 and the second I/O ports 201 connected to each other are set to the push-pull input mode and the push-pull output mode, respectively. The first I/O port 111 for transmitting a first notification signal is set to the signal-line-voltage fixed mode (output voltage=active notification). The second I/O port 212 for receiving this first notification signal is set to the push-pull input mode or to the signal-line-voltage-fixed input mode (output voltage=active notification). The second I/O port 211 for transmitting a second notification signal is set to the signal-line-voltage fixed mode (output voltage=active notification). The first I/O port 112 for receiving this second notification signal is set to the push-pull input mode or to the signal-line-voltage-fixed input mode (output voltage=active notification).

In the integrated circuit system, the voltage used for active notification by the first integrated circuit IC1 may be identical to, or may be different from, the voltage used for active notification by the second integrated circuit IC2. For example, the first notification signal produced by the first integrated circuit IC1 may be high for active notification and low for sleep notification while the second notification signal produced by the second integrated circuit IC2 may be low for active notification and high for sleep notification. The following description will be directed to a case in which the first integrated circuit IC1 and the second integrated circuit IC2 use the same voltage for active notification, and, also, use the same voltage for sleep notification.

In the integrated circuit system illustrated in FIG. 1, the first notification signal indicates the active mode while the first integrated circuit IC1 is in the active mode. Immediately prior to the transition of the first integrated circuit IC1 to the sleep mode upon the completion of the active mode, the first integrated circuit IC1 sets the first notification signal to make it indicate the sleep mode. Similarly, immediately prior to the transition of the second integrated circuit IC2 to the sleep mode upon the completion of the active mode, the second integrated circuit IC2 sets the second notification signal to make it indicate the sleep mode. The first integrated circuit IC1 and the second integrated circuit IC2 set the first notification signal and the second notification signal, respectively, to a voltage level indicative of the active mode upon returning to the active mode from the sleep mode. These notifying actions allows the I/O ports to be set to proper signal input and output modes even when a transition is made between the operation modes. As a consequence, each I/O port may be set to a proper signal input and output mode as illustrated in the table of FIG. 6 with respect to each combination among the active mode and the sleep mode, thereby avoiding needless power consumption.

In the following, a description will be given of the processes performed by the integrated circuits of an integrated circuit system when the integrated circuits make a transition between operation modes.

FIG. 7 is a drawing illustrating the case in which the second integrated circuit IC2 makes a transition to the sleep mode from the state in which both the first integrated circuit IC1 and the second integrated circuit IC2 are in the active mode. In the active mode, the first I/O ports 101 and 102 of the first integrated circuit IC1 are placed in the push-pull output mode and the push-pull input mode, respectively. Further, the first I/O port 111 is placed in the signal-line-voltage fixed mode (output voltage=active notification), and the first I/O port 112 is placed in either the push-pull input mode or the signal-line-voltage-fixed input mode (output voltage=active notification). In the active mode, the second I/O ports 202 and 201 of the second integrated circuit IC2 are placed in the push-pull input mode and the push-pull output mode, respectively. Further, the second I/O port 212 is placed in either the push-pull input mode or the signal-line-voltage-fixed input mode (output voltage=active notification), and the second I/O port 211 is placed in the signal-line-voltage fixed mode (output voltage=active notification). In this active-mode state, the first integrated circuit IC1 and the second integrated circuit IC2 are notifying each other of active notification.

Subsequently, the second integrated circuit IC2 makes a transition to the sleep mode after changing the second notification signal output from the second I/O port 211 to the sleep notification voltage. As the second integrated circuit IC2 makes a transition to the sleep mode, the second I/O ports 201, 202, 211, and 212 are all set to the high-impedance mode. Upon learning based on the second notification signal from the second integrated circuit IC2 that the second integrated circuit IC2 is making a transition to the sleep mode, the first integrated circuit IC1 sets its I/O ports to the signal input and output modes as illustrated in FIG. 7. To be specific, the first I/O ports 101 and 102 of the first integrated circuit IC1 are both placed in the signal-line-voltage fixed mode. Further, the first I/O port 111 is placed in the signal-line-voltage fixed mode (output voltage=active notification), and the first I/O port 112 is placed in the signal-line-voltage-fixed input mode (output voltage=sleep notification). Setting the first I/O port 112 to the signal-line-voltage-fixed input mode (output voltage=sleep notification) allows the first I/O port 112 to detect the return of the second integrated circuit IC2 to the active mode when such a return occurs at a later time.

Figure 8:
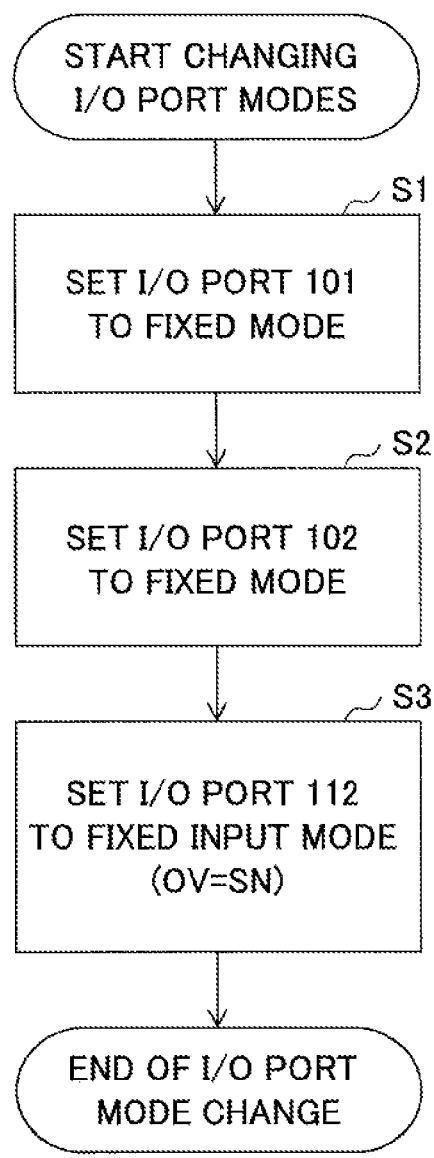
FIG. 8 is a flowchart illustrating the control procedure that is performed by the first integrated circuit to implement changes in the signal input and output modes illustrated in FIG. 7.

FIG. 8 is a flowchart illustrating the control procedure that is performed by the first integrated circuit IC1 to implement changes in the signal input and output modes illustrated in FIG. 7. The control circuit of the first integrated circuit IC1 (e.g., the CPU 10 of FIG. 2) may perform each step of the flowchart illustrated in FIG. 8.

It may be noted that, in FIG. 8 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

The control circuit of the first integrated circuit IC1 performs the control processes specified by the flowchart of FIG. 8 upon detecting, as an interrupt request, for example, that the second notification signal from the second integrated circuit IC2 changes to the voltage indicative of the sleep mode. In step S1, the first integrated circuit IC1 sets the first I/O ports 101 to the signal-line-voltage fixed mode. In step S2, the first integrated circuit IC1 sets the first I/O ports 102 to the signal-line-voltage fixed mode. In step S3, the first integrated circuit IC1 sets the first I/O port 112 to the signal-line-voltage-fixed input mode (output voltage=sleep notification). With this, the control procedure by the first integrated circuit IC1 to set signal input and output modes comes to an end.

Figure 9:
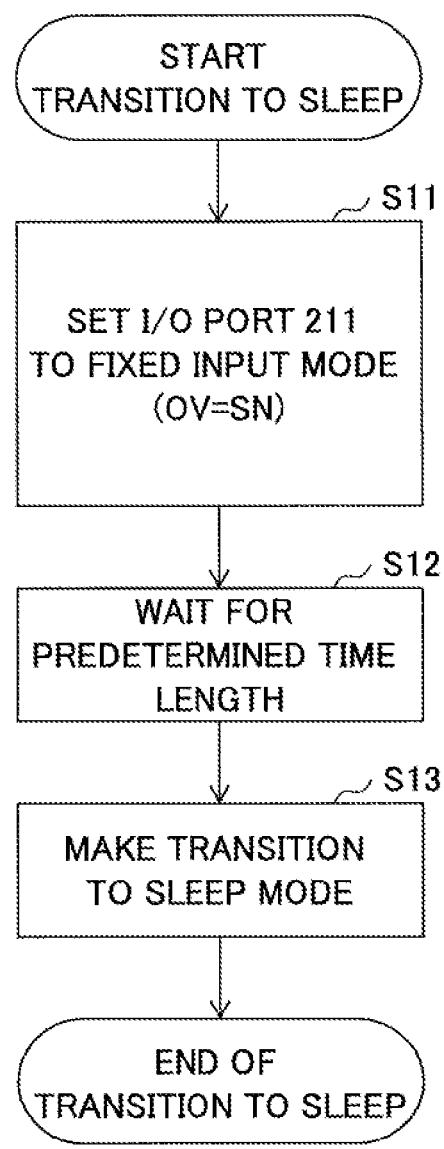
FIG. 9 is a flowchart illustrating the control procedure that is performed by the second integrated circuit to implement changes in the signal input and output modes illustrated in FIG. 7.

FIG. 9 is a flowchart illustrating the control procedure that is performed by the second integrated circuit IC2 to implement changes in the signal input and output modes illustrated in FIG. 7. The control circuit of the second integrated circuit IC2 (e.g., the CPU 10 of FIG. 2) may perform each step of the flowchart illustrated in FIG. 9.

At the time of making a transition to the sleep mode upon the completion of the active mode, the control circuit of the second integrated circuit IC2 performs the control processes specified by the flowchart of FIG. 9. In step S11, the second integrated circuit IC2 sets the second I/O port 211 to the signal-line-voltage-fixed input mode (output voltage=sleep notification). This change of voltage of the second notification signal to the voltage indicative of the sleep mode notifies the first integrated circuit IC1 of a transition of the second integrated circuit IC2 to the sleep mode. In step S12, the second integrated circuit IC2 waits for the passage of a predetermined time length. Upon the passage of the predetermined time length, the second integrated circuit IC2 makes a transition to the sleep mode in step S13. The second integrated circuit IC2 having made a transition to the sleep mode has the second I/O ports 201, 202, 211, and 212 in the high-impedance mode. The length of the wait time of the second integrated circuit IC2 in step S12 may be commensurate with the time length required for the first integrated circuit IC1 to change the modes of the first I/O ports 101, 102, and 112. To be specific, an experiment may be conducted to measure the time required for the first integrated circuit IC1 to change the modes of the first I/O ports 101, 102, and 112, and, a time length slightly longer (e.g., with a 10% increase) than the measured time length may be used. The provision of such a wait time prevents the second I/O ports of the second integrated circuit IC2 from being set in the high-impedance mode while the first I/O ports of the first integrated circuit IC1 are in the push-pull input mode.

Figure 10:
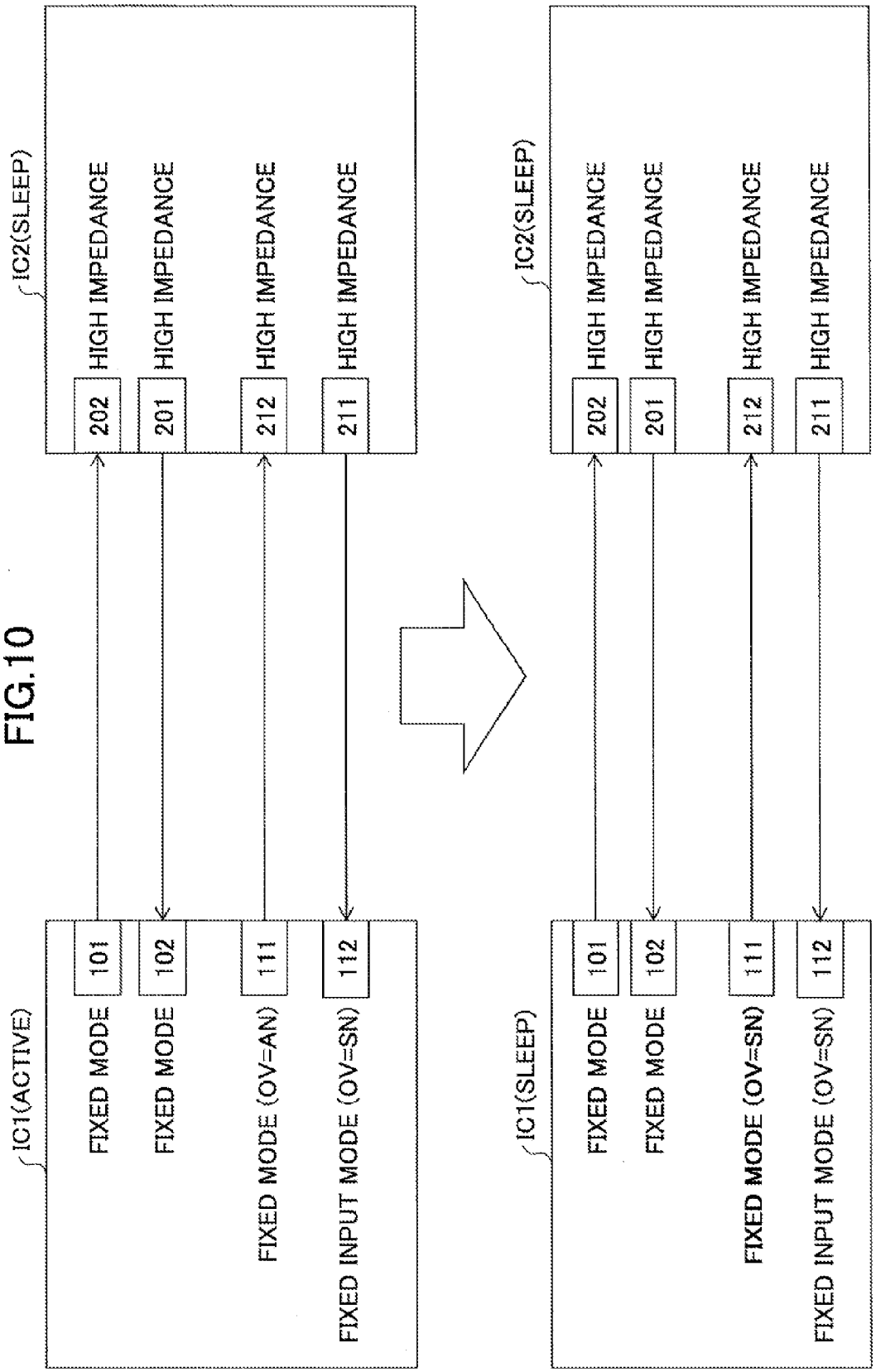
FIG. 10 is a drawing illustrating the case in which the first integrated circuit makes a transition to the sleep mode from the state in which the first integrated circuit and the second integrated circuit are in the active mode and the sleep mode, respectively.

FIG. 10 is a drawing illustrating the case in which the first integrated circuit IC1 makes a transition to the sleep mode from the state in which the first integrated circuit IC1 and the second integrated circuit IC2 are in the active mode and the sleep mode, respectively. With the second integrated circuit IC2 being in the sleep mode, the first I/O ports 101 and 102 of the first integrated circuit IC1 in the active mode are both in the signal-line-voltage fixed mode. Further, the first I/O port 111 is placed in the signal-line-voltage fixed mode (output voltage=active notification), and the first I/O port 112 is placed in the signal-line-voltage-fixed input mode (output voltage=sleep notification). The second integrated circuit IC2 in the sleep mode has the second I/O ports 201, 202, 211, and 212 in the high-impedance mode.

Subsequently, the first integrated circuit IC1 makes a transition to the sleep mode after changing the first notification signal output from the first I/O port 111 to the sleep notification voltage. Namely, the mode of the first I/O port 111 of the first integrated circuit IC1 is changed to the signal-line-voltage fixed mode (output voltage=sleep notification).

Figure 11:
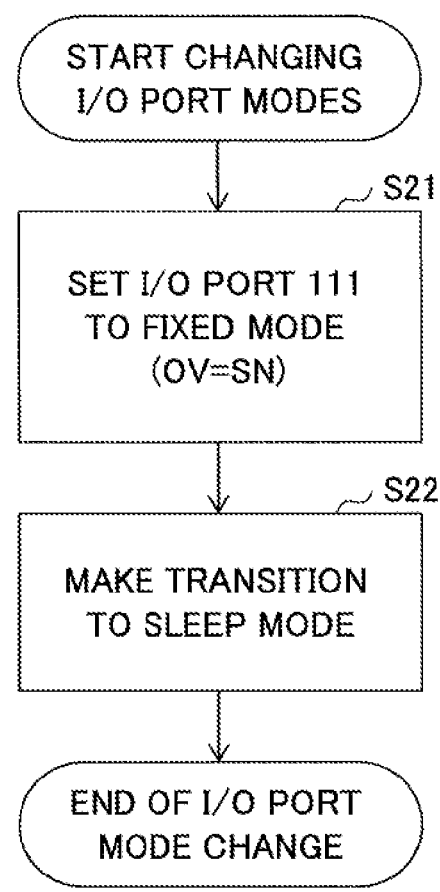
FIG. 11 is a flowchart illustrating the control procedure that is performed by the first integrated circuit to implement changes in the signal input and output modes illustrated in FIG. 10.

FIG. 11 is a flowchart illustrating the control procedure that is performed by the first integrated circuit IC1 to implement changes in the signal input and output modes illustrated in FIG. 10. The control circuit of the first integrated circuit IC1 (e.g., the CPU 10 of FIG. 2) may perform each step of the flowchart illustrated in FIG. 11.

At the time of making a transition to the sleep mode upon the completion of the active mode, the control circuit of the first integrated circuit IC1 performs the control processes specified by the flowchart of FIG. 11. In step S21, the first integrated circuit IC1 sets the first I/O port 111 to the signal-line-voltage fixed mode (output voltage=sleep notification). In step S22, the first integrated circuit IC1 makes a transition to the sleep mode. With this, the control procedure by the first integrated circuit IC1 to set signal input and output modes and to make an operation-mode transition comes to an end.

Figure 12:
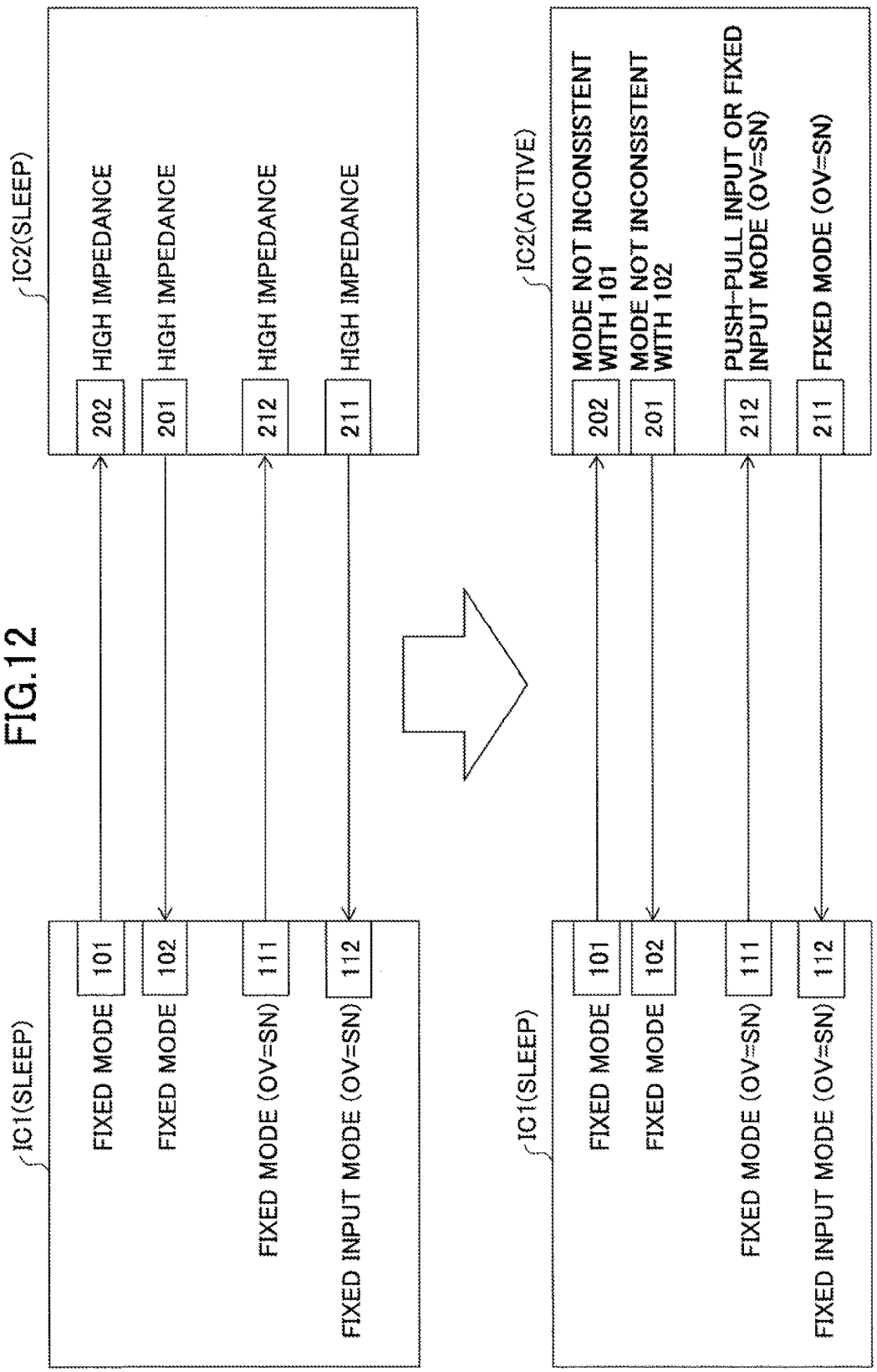
FIG. 12 is a drawing illustrating the case in which the second integrated circuit makes a transition to the active mode from the state in which both the first integrated circuit and the second integrated circuit are in the sleep mode.

FIG. 12 is a drawing illustrating the case in which the second integrated circuit IC2 makes a transition to the active mode from the state in which both the first integrated circuit IC1 and the second integrated circuit IC2 are in the sleep mode, in response to an interrupt signal supplied from the interrupt controller that has received a signal from the timer of FIG. 2 or from some other peripheral circuit (not shown). A signal from the peripheral circuit may be a DMA (i.e., direct memory access) completion signal supplied from a DMA controller, for example. The first I/O ports 101 and 102 of the first integrated circuit IC1 in the sleep mode are both in the signal-line-voltage fixed mode. Further, the first I/O port 111 is placed in the signal-line-voltage fixed mode (output voltage=sleep notification), and the first I/O port 112 is placed in the signal-line-voltage-fixed input mode (output voltage=sleep notification). The second integrated circuit IC2 in the sleep mode has the second I/O ports 201, 202, 211, and 212 in the high-impedance mode.

Subsequently, the second integrated circuit IC2 makes a transition to the active mode. Upon the transition to the active mode, the second I/O ports 202 and 201 of the second integrated circuit IC2 are set to the modes that are not inconsistent with the signal input and output modes of the first I/O ports 101 and 102 of the first integrated circuit IC1, respectively. Namely, the signal input and output modes that are indicated as "OK" in FIG. 5 are used. The second I/O port 212 for receiving the first notification signal is set to the push-pull input mode or to the signal-line-voltage-fixed input mode (output voltage=sleep notification).

Since the second integrated circuit IC2 is placed in the active mode, the second notification signal transmitted from the second I/O port 211 to the first I/O port 112 is supposed to be set to the voltage indicative of the active mode according to the originally intended setting of the second notification signal. However, the first I/O port 112 of the first integrated circuit IC1 in the sleep mode is placed in the signal-line-voltage-fixed input mode (output voltage=sleep notification), so that the second notification signal at the active notification voltage causes a steady current to flow at this I/O port. In consideration of this, in the case of detecting the sleep mode of the first integrated circuit IC1 based on the first notification signal, the second integrated circuit IC2 transmits the second notification signal set at the voltage indicative of the sleep mode despite the fact that the second integrated circuit IC2 is in fact in the active mode. Namely, the second integrated circuit IC2 in the active mode sets the second notification signal to the voltage indicative of the sleep mode when the first notification signal indicative of the sleep mode of the first integrated circuit IC1 is being received. It may be noted that the second integrated circuit IC2 sets the second notification signal to the voltage indicative of the active mode when the first notification signal indicative of the active mode of the first integrated circuit IC1 is being received. When the counterpart device (i.e., the first integrated circuit IC1) is currently able (i.e., in the active mode) to detect the second notification signal, the second notification signal is preferably set to the correct notification voltage (i.e., the active notification voltage). When the counterpart device is currently unable (i.e., in the sleep mode) to detect the second notification signal, there is no need to set the second notification signal to the correct notification voltage because no counterpart device detects the second notification signal.

Figure 13:
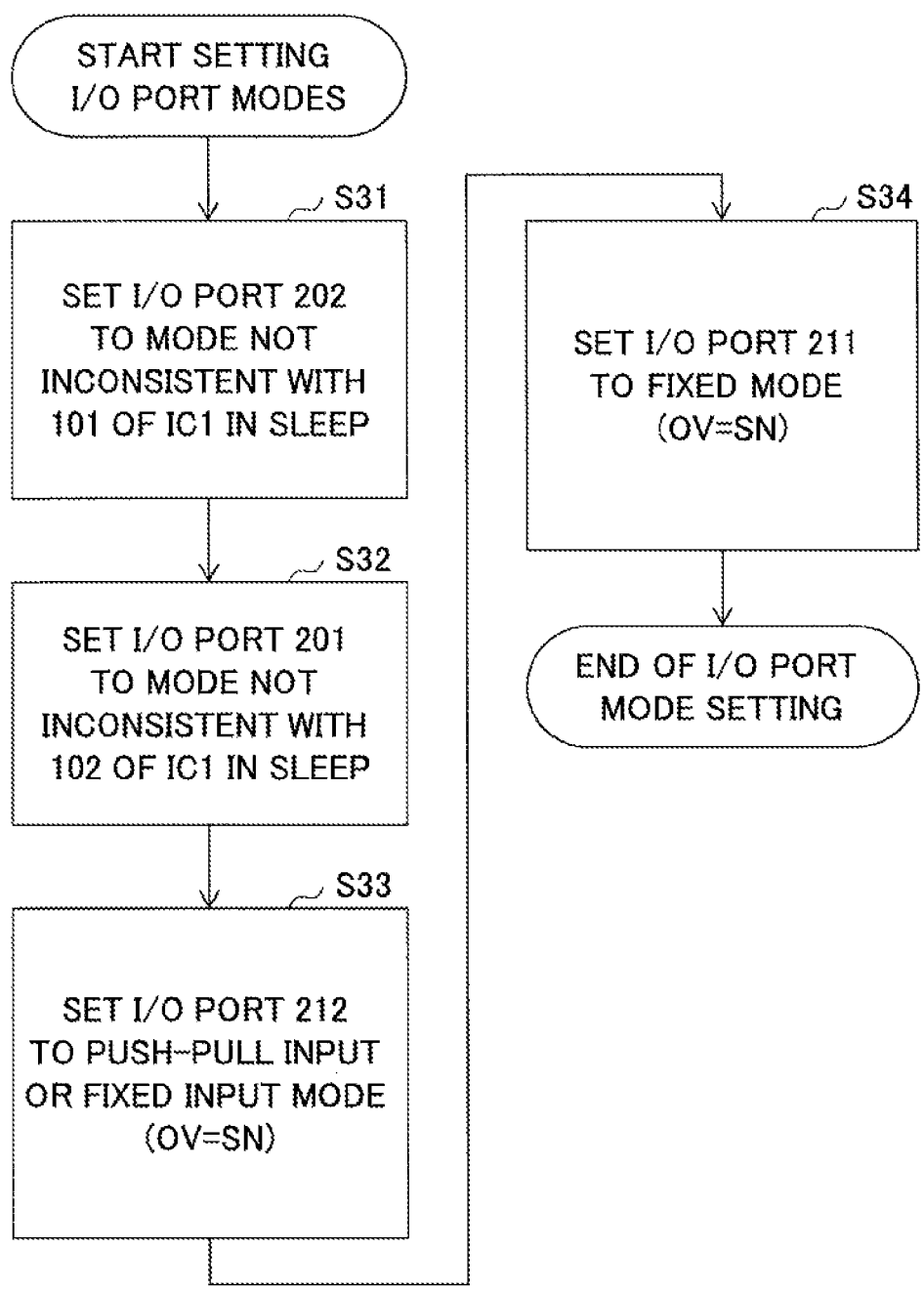
FIG. 13 is a flowchart illustrating the control procedure that is performed by the second integrated circuit to implement changes in the signal input and output modes illustrated in FIG. 12.

FIG. 13 is a flowchart illustrating the control procedure that is performed by the second integrated circuit IC2 to implement changes in the signal input and output modes illustrated in FIG. 12. The control circuit of the second integrated circuit IC2 (e.g., the CPU 10 of FIG. 2) may perform each step of the flowchart illustrated in FIG. 13.

Upon making a transition to the active mode, the control circuit of the second integrated circuit IC2 performs the control processes specified by the flowchart of FIG. 13. In step S31, the second integrated circuit IC2 sets the second I/O ports 202 to the mode that is not inconsistent with the signal input and output mode of the first I/O ports 101 of the first integrated circuit IC1 placed in the sleep mode. In step S32, the second integrated circuit IC2 sets the second I/O ports 201 to the mode that is not inconsistent with the signal input and output mode of the first I/O ports 102 of the first integrated circuit IC1 placed in the sleep mode. In step S33, the second integrated circuit IC2 sets the second I/O port 212 to either the push-pull input mode or the signal-line-voltage-fixed input mode (output voltage=sleep notification). In step S34, the second integrated circuit IC2 sets the second I/O port 211 to the signal-line-voltage fixed mode (output voltage=sleep notification). With this, the control procedure by the second integrated circuit IC2 to set signal input and output modes comes to an end. It may be noted that, in this control procedure, the setting of the second I/O port 212 in step S33 may alternatively be performed first.

Figure 14:
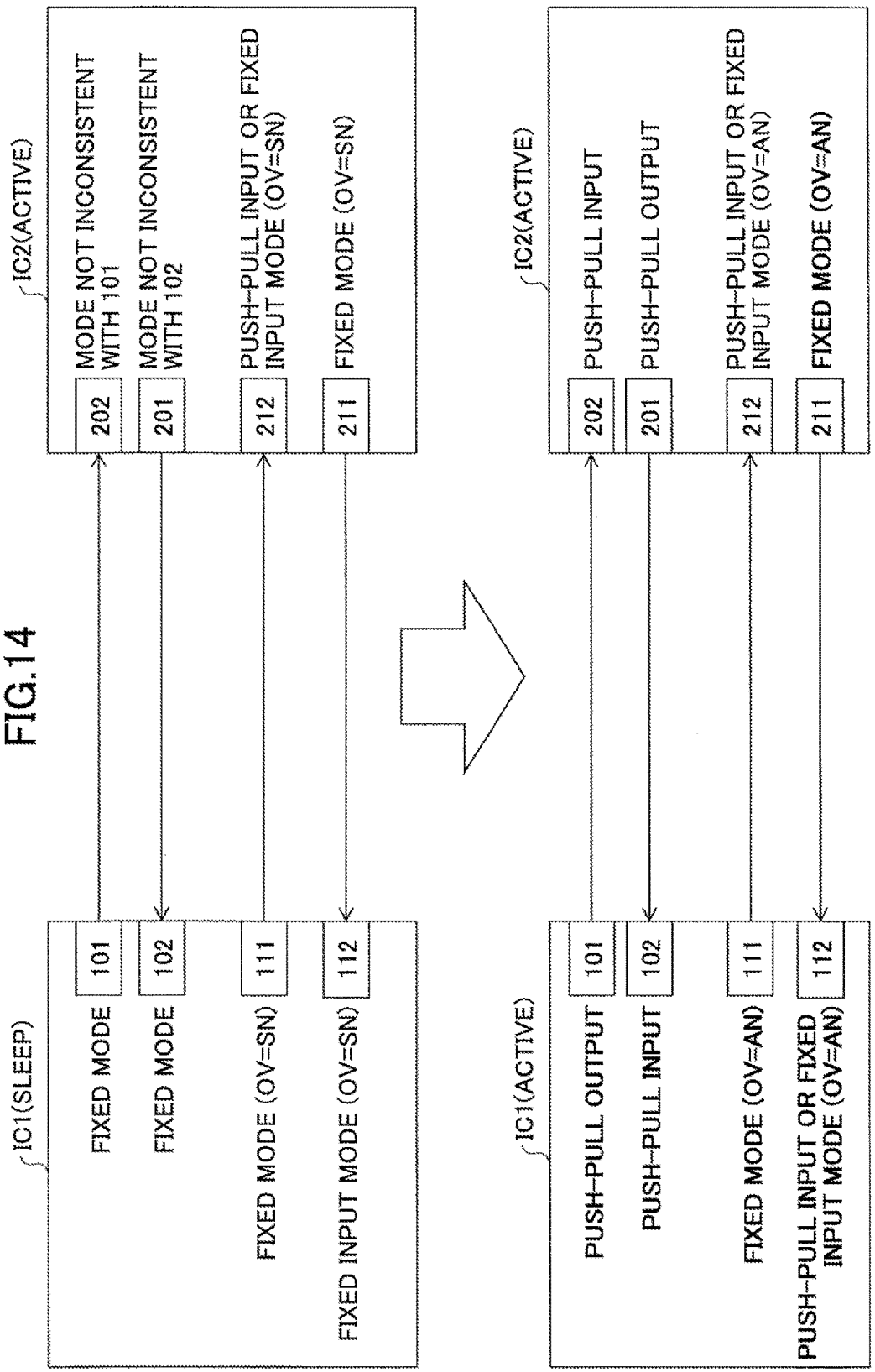
FIG. 14 is a drawing illustrating the case in which the first integrated circuit makes a transition to the active mode from the state in which the first integrated circuit and the second integrated circuit are in the sleep mode and the active mode, respectively.

FIG. 14 is a drawing illustrating the case in which the first integrated circuit IC1 makes a transition to the active mode from the state in which the first integrated circuit IC1 and the second integrated circuit IC2 are in the sleep mode and active mode, respectively, in response to an interrupt signal supplied from the interrupt controller that has received a signal from the timer of FIG. 2 or from some other peripheral circuit (not shown) or a signal supplied through an I/O port from another IC such as the second integrated circuit IC2. The first I/O ports 101 and 102 of the first integrated circuit IC1 in the sleep mode are both in the signal-line-voltage fixed mode. Further, the first I/O port 111 is placed in the signal-line-voltage fixed mode (output voltage=sleep notification), and the first I/O port 112 is placed in the signal-line-voltage-fixed input mode (output voltage=sleep notification). In this state, the second I/O ports 202 and 201 of the second integrated circuit IC2 in the active mode are set to the modes that are not inconsistent with the signal input and output modes of the first I/O ports 101 and 102 of the first integrated circuit IC1, respectively. The second I/O port 212 for receiving the first notification signal is either in the push-pull input mode or in the signal-line-voltage-fixed input mode (output voltage=sleep notification). Further, the second I/O port 211 for transmitting a second notification signal is in the signal-line-voltage fixed mode (output voltage=sleep notification).

Subsequently, the first integrated circuit IC1 makes a transition to the active mode. Upon the transition to the active mode, the first integrated circuit IC1 sets the first I/O port 111 to the signal-line-voltage fixed mode (output voltage=active notification). Upon receiving the active notification by the first notification signal from the first I/O port 111 of the first integrated circuit IC1, the second integrated circuit IC2 performs operations, as an interrupt operation, for example, to set the second I/O ports to the following signal input and output modes. Namely, the second I/O ports 202 and 201 of the second integrated circuit IC2 are set to the push-pull input mode and the push-pull output mode, respectively. Further, the second I/O port 212 is set to either the push-pull input mode or the signal-line-voltage-fixed input mode (output voltage=active notification), and the second I/O port 211 is set to the signal-line-voltage fixed mode (output voltage=active notification).

Upon receiving the active notification by the second notification signal from the second integrated circuit IC2, the first integrated circuit IC1 performs operations, as an interrupt operation, for example, to set the first I/O ports 101, 102, and 112 to the following signal input and output modes. Namely, the first I/O ports 101 and 102 of the first integrated circuit IC1 are set to the push-pull output mode and the push-pull input mode, respectively. The first I/O port 112 is set to the push-pull input mode or to the signal-line-voltage-fixed input mode (output voltage=active notification).

Figure 15A:
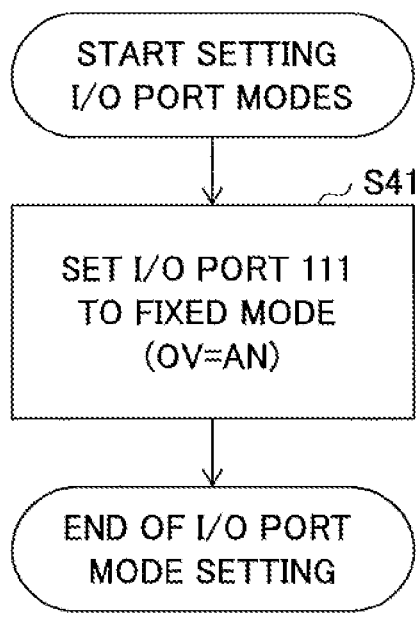
FIGS. 15A and 15B are flowcharts illustrating the control procedure that is performed by the first integrated circuit to implement changes in the signal input and output modes illustrated in FIG. 14.
Figure 15B:
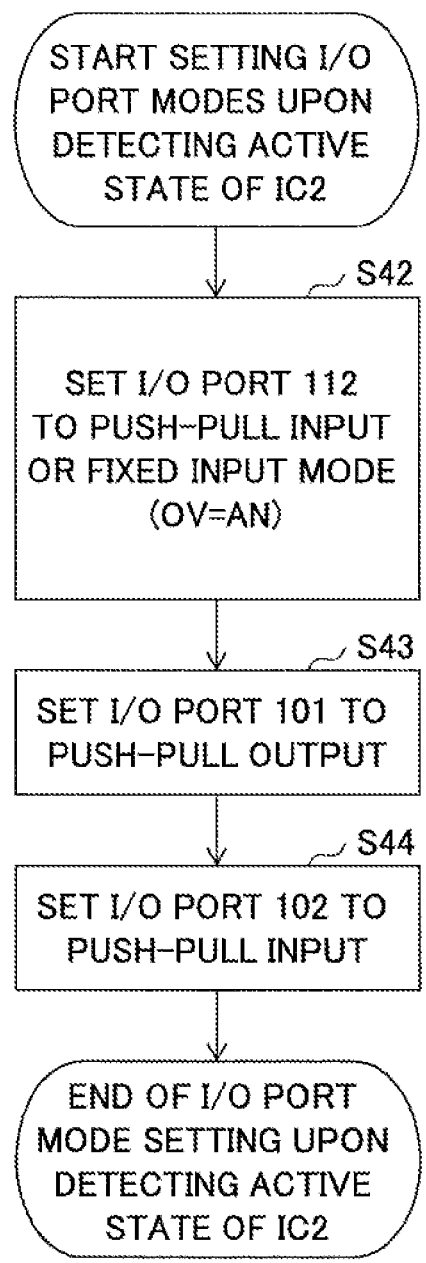
Figure 16:
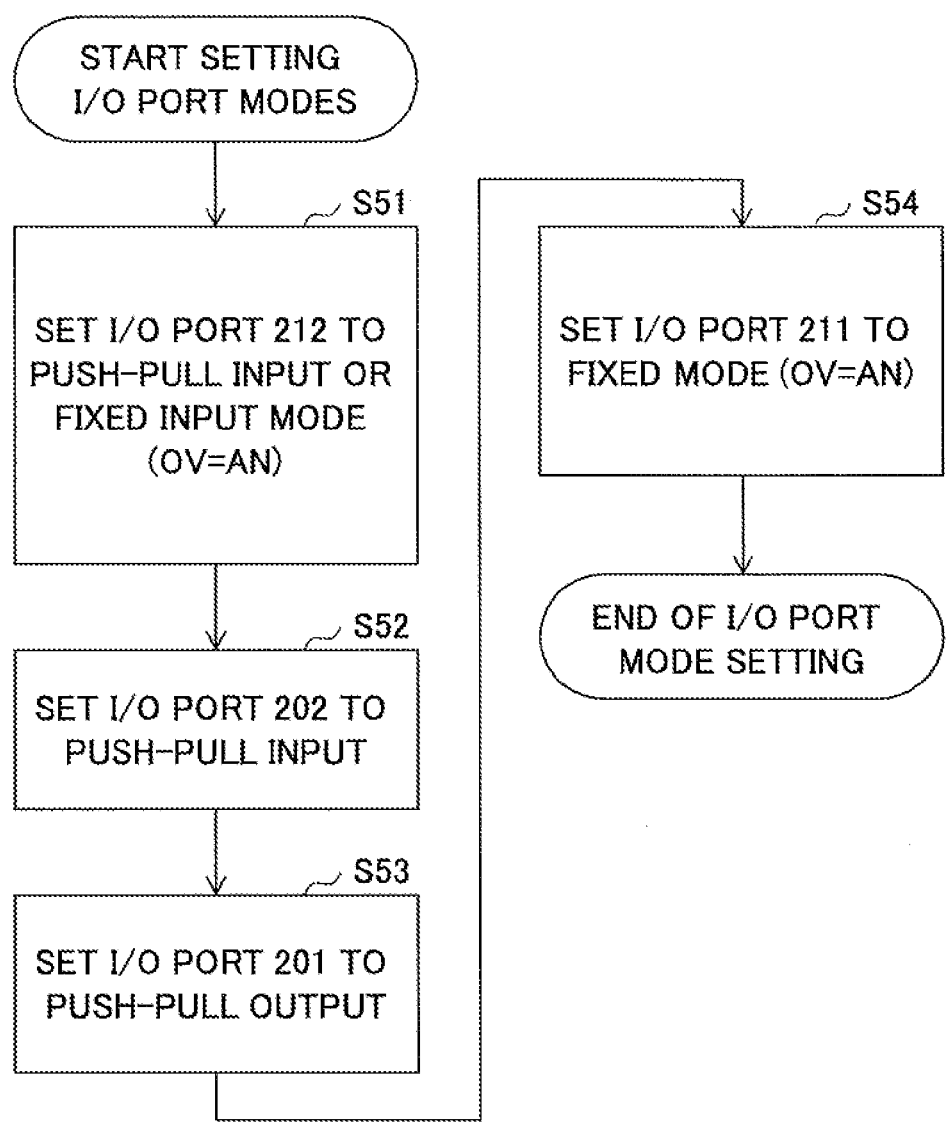
FIG. 16 is a flowchart illustrating the control procedure that is performed by the second integrated circuit to implement changes in the signal input and output modes illustrated in FIG. 14.

FIGS. 15A and 15B are flowcharts illustrating the control procedure that is performed by the first integrated circuit IC1 to implement changes in the signal input and output modes illustrated in FIG. 14. FIG. 16 is a flowchart illustrating the control procedure that is performed by the second integrated circuit IC2 to implement changes in the signal input and output modes illustrated in FIG. 14. The control circuit of the first integrated circuit IC1 (e.g., the CPU 10 of FIG. 2) may perform each step of the flowcharts illustrated in FIGS. 15A and 15B. The control circuit of the second integrated circuit IC2 (e.g., the CPU 10 of FIG. 2) may perform each step of the flowchart illustrated in FIG. 16.

Upon making a transition to the active mode, the control circuit of the first integrated circuit IC1 performs the control processes specified by the flowchart of FIG. 15A. In step S41, the first integrated circuit IC1 sets the first I/O port 111 for transmitting the first notification signal to the signal-line-voltage fixed mode (output voltage=active notification). With this, the first stage of the control procedure by the first integrated circuit IC1 to set signal input and output modes comes to an end.

Upon the first notification signal turning into the active notification, the control circuit of the second integrated circuit IC2 performs the control processes specified by the flowchart of FIG. 16 as an interrupt process, for example. In step S51, the second integrated circuit IC2 sets the second I/O port 212 to either the push-pull input mode or the signal-line-voltage-fixed input mode (output voltage=active notification). In step S52, the second integrated circuit IC2 sets the second I/O port 202 to the push-pull input mode. In step S53, the second integrated circuit IC2 sets the second I/O port 201 to the push-pull output mode. In step S54, the second integrated circuit IC2 sets the second I/O port 211 to the signal-line-voltage fixed mode (output voltage=active notification). With this, the control procedure by the second integrated circuit IC2 to set signal input and output modes comes to an end.

In response to the change to the active notification of the second notification signal supplied from the second I/O port 211 of the second integrated circuit IC2, the first integrated circuit IC1 performs the control processes specified by the flowchart of FIG. 15B as an interrupt process, for example. In step S42, the first integrated circuit IC1 sets the first I/O port 112 to the signal-line-voltage-fixed input mode (output voltage=active notification). In step S43, the first integrated circuit IC1 sets the first I/O port 101 to the push-pull output mode. In step S44, the first integrated circuit IC1 sets the first I/O port 102 to the push-pull input mode. With this, the second stage of the control procedure by the first integrated circuit IC1 to set signal input and output modes comes to an end.

Figure 17:
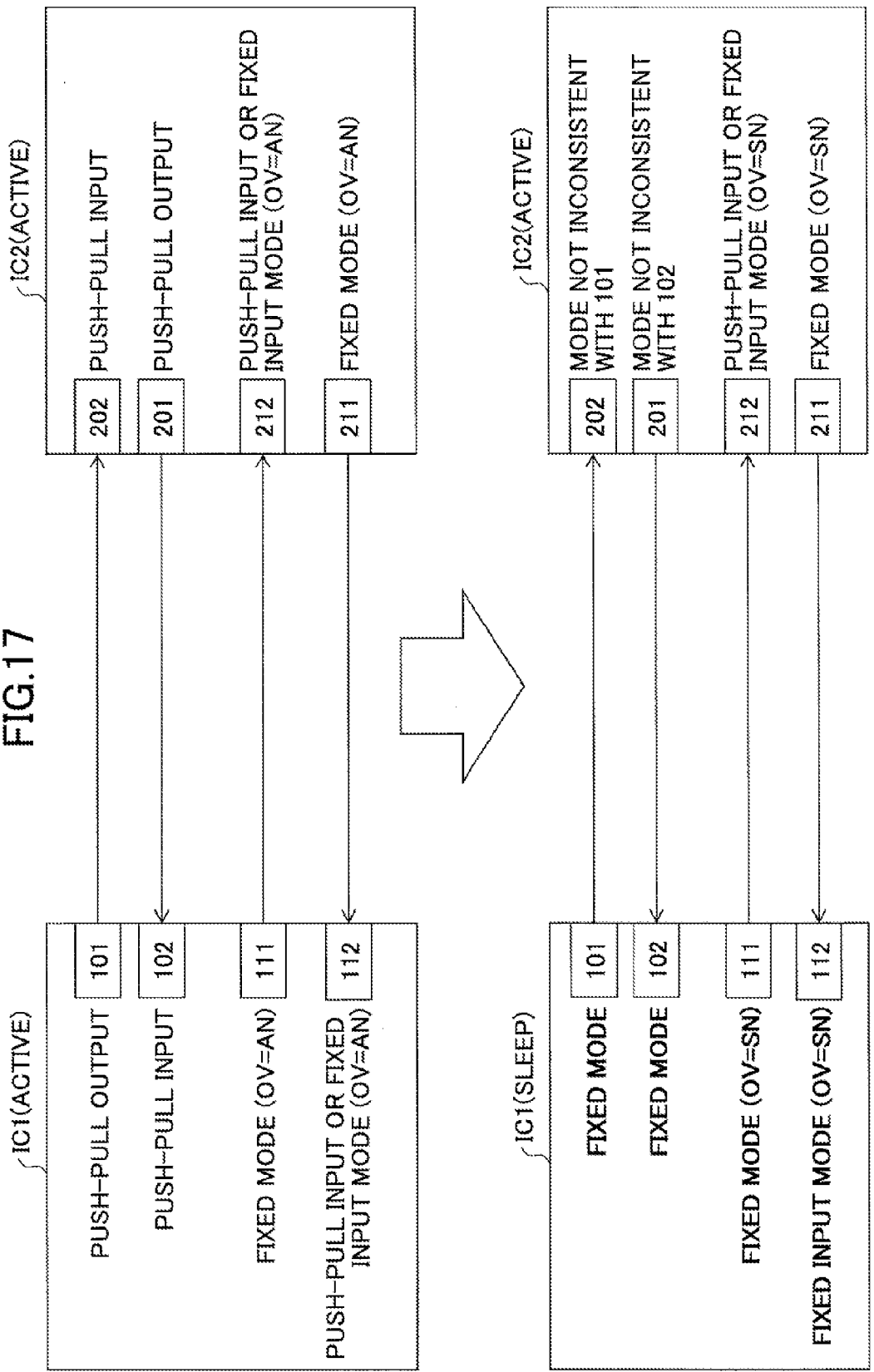
FIG. 17 is a drawing illustrating the case in which the first integrated circuit makes a transition to the sleep mode from the state in which both the first integrated circuit and the second integrated circuit are in the active mode.

FIG. 17 is a drawing illustrating the case in which the first integrated circuit IC1 makes a transition to the sleep mode from the state in which both the first integrated circuit IC1 and the second integrated circuit IC2 are in the active mode. In the active mode, the first I/O ports 101 and 102 of the first integrated circuit IC1 are placed in the push-pull output mode and the push-pull input mode, respectively. Further, the first I/O port 111 is placed in the signal-line-voltage fixed mode (output voltage=active notification), and the first I/O port 112 is placed in either the push-pull input mode or the signal-line-voltage-fixed input mode (output voltage=active notification). In the active mode, the second I/O ports 202 and 201 of the second integrated circuit IC2 are placed in the push-pull input mode and the push-pull output mode, respectively. Further, the second I/O port 212 is placed in either the push-pull input mode or the signal-line-voltage-fixed input mode (output voltage=active notification), and the second I/O port 211 is placed in the signal-line-voltage fixed mode (output voltage=active notification). In this active-mode state, the first integrated circuit IC1 and the second integrated circuit IC2 are notifying each other of active notification.

Subsequently, the first integrated circuit IC1 makes a transition to the sleep mode after changing the first notification signal output from the first I/O port 111 to the sleep notification voltage. Before the first integrated circuit IC1 makes a transition to the sleep mode, the first integrated circuit IC1 sets the first I/O ports 101 and 102 to the signal-line-voltage fixed mode. Further, the first I/O port 111 is set to the signal-line-voltage fixed mode (output voltage=sleep notification), and the first I/O port 112 is set to the signal-line-voltage-fixed input mode (output voltage=sleep notification). These settings of signal input and output modes are determined by taking into account the possibility that the second integrated circuit IC2 may make a transition to the sleep mode while the first integrated circuit IC1 is in the sleep mode. Namely, the settings of signal input and output modes are made such that no through currents flow at the first I/O ports of the first integrated circuit IC1 even when the second I/O ports of the second integrated circuit IC2 are set to the high-impedance mode.

Moreover, the second I/O ports 202 and 201 of the second integrated circuit IC2 are set to the modes that are not inconsistent with the signal input and output modes of the first I/O ports 101 and 102 of the first integrated circuit IC1, respectively. The second I/O port 212 for receiving the first notification signal is set to the push-pull input mode or to the signal-line-voltage-fixed input mode (output voltage=sleep notification). Further, the second I/O port 211 for transmitting a second notification signal is set to the signal-line-voltage fixed mode (output voltage=sleep notification).

Figure 18:
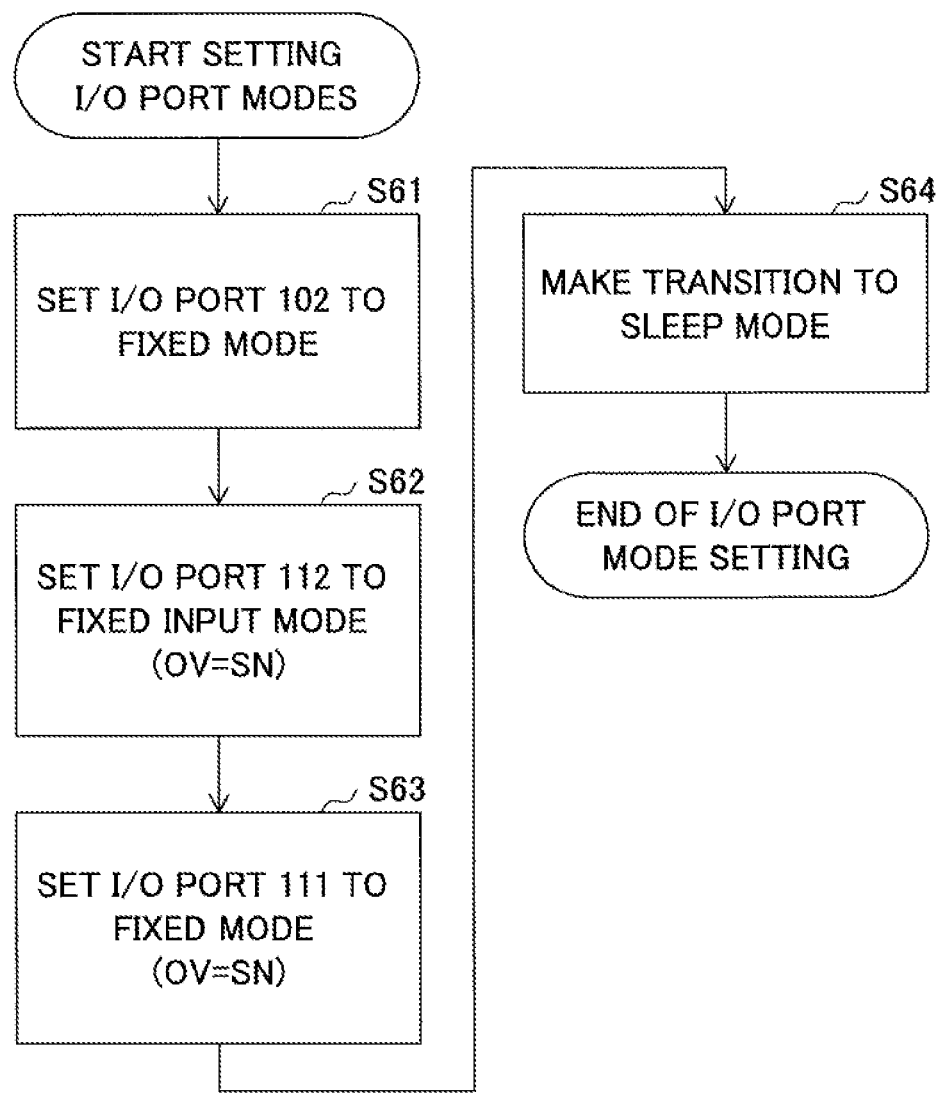
FIG. 18 is a flowchart illustrating the control procedure that is performed by the first integrated circuit to implement changes in the signal input and output modes illustrated in FIG. 17.

FIG. 18 is a flowchart illustrating the control procedure that is performed by the first integrated circuit IC1 to implement changes in the signal input and output modes illustrated in FIG. 17. The control circuit of the first integrated circuit IC1 (e.g., the CPU 10 of FIG. 1) may perform each step of the flowchart illustrated in FIG. 18.

At the time of making a transition to the sleep mode upon the completion of the active mode, the control circuit of the first integrated circuit IC1 performs the control processes specified by the flowchart of FIG. 18. In step S61, the first integrated circuit IC1 sets the first I/O ports 102 to the signal-line-voltage fixed mode. In step S62, the first integrated circuit IC1 sets the first I/O port 112 to the signal-line-voltage-fixed input mode (output voltage=sleep notification). In step S63, the first integrated circuit IC1 sets the first I/O port 111 to the signal-line-voltage fixed mode (output voltage=sleep notification). In step S64, the first integrated circuit IC1 makes a transition to the sleep mode. With this, the control procedure by the first integrated circuit IC1 to set signal input and output modes comes to an end.

It may be noted that the first I/O ports 101 in the active mode are placed in the push-pull output mode. Since the signal-line-voltage fixed mode required in the sleep mode includes the push-pull output mode, a mode change to the first I/O ports 101 may be omitted. Further, the order of steps S61 through S63 may be changed to any order.

Figure 19:
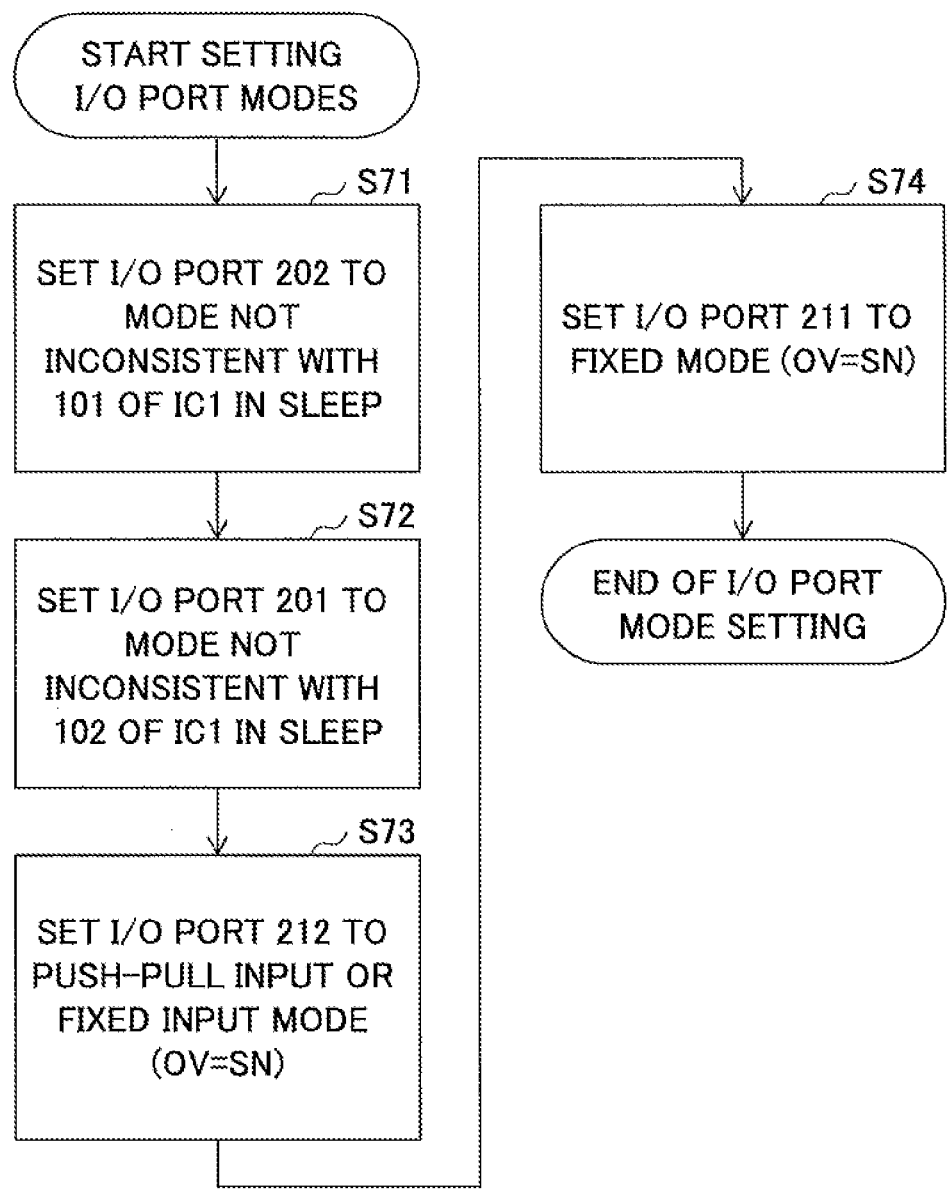
FIG. 19 is a flowchart illustrating the control procedure that is performed by the second integrated circuit to implement changes in the signal input and output modes illustrated in FIG. 17.

FIG. 19 is a flowchart illustrating the control procedure that is performed by the second integrated circuit IC2 to implement changes in the signal input and output modes illustrated in FIG. 17. The control circuit of the second integrated circuit IC2 (e.g., the CPU 10 of FIG. 2) may perform each step of the flowchart illustrated in FIG. 19.

In response to the sleep notification by the first notification signal, the control circuit of the second integrated circuit IC2 performs the control processes specified by the flowchart of FIG. 19. In step S71, the second integrated circuit IC2 sets the second I/O ports 202 to the mode that is not inconsistent with the signal input and output mode of the first I/O ports 101 of the first integrated circuit IC1 placed in the sleep mode. In step S72, the second integrated circuit IC2 sets the second I/O ports 201 to the mode that is not inconsistent with the signal input and output mode of the first I/O ports 102 of the first integrated circuit IC1 placed in the sleep mode. In step S73, the second integrated circuit IC2 sets the second I/O port 212 to either the push-pull input mode or the signal-line-voltage-fixed input mode (output voltage=sleep notification). In step S74, the second integrated circuit IC2 sets the second I/O port 211 to the signal-line-voltage fixed mode (output voltage=sleep notification). With this, the control procedure by the second integrated circuit IC2 to set signal input and output modes comes to an end.

In the flowchart of FIG. 18, the first integrated circuit IC1 may set the first notification signal at the first I/O port 111 to the sleep notification voltage before the remaining first I/O ports. Further, the first I/O port 112 in the active mode may be placed in the push-pull input mode. In such a case, changing the second I/O port 211 to the signal-line-voltage fixed mode (output voltage=sleep notification) in response to the sleep notification by the first notification signal causes neither a steady current nor a through current to flow at the second I/O port 211 and the first I/O port 112. The first integrated circuit IC1 thereafter sets the first I/O port 112 to the signal-line-voltage-fixed input mode (output voltage=sleep notification), which allows an operation mode transition to be made without a single incident of through current or steady current. Further, placing the second I/O port 212 of the second integrated circuit IC2 receiving the first notification signal in the push-pull input mode in the active mode prevents a steady current from flowing at the second I/O port 212 even when the first notification signal is changed to the sleep notification voltage.

Figure 20:
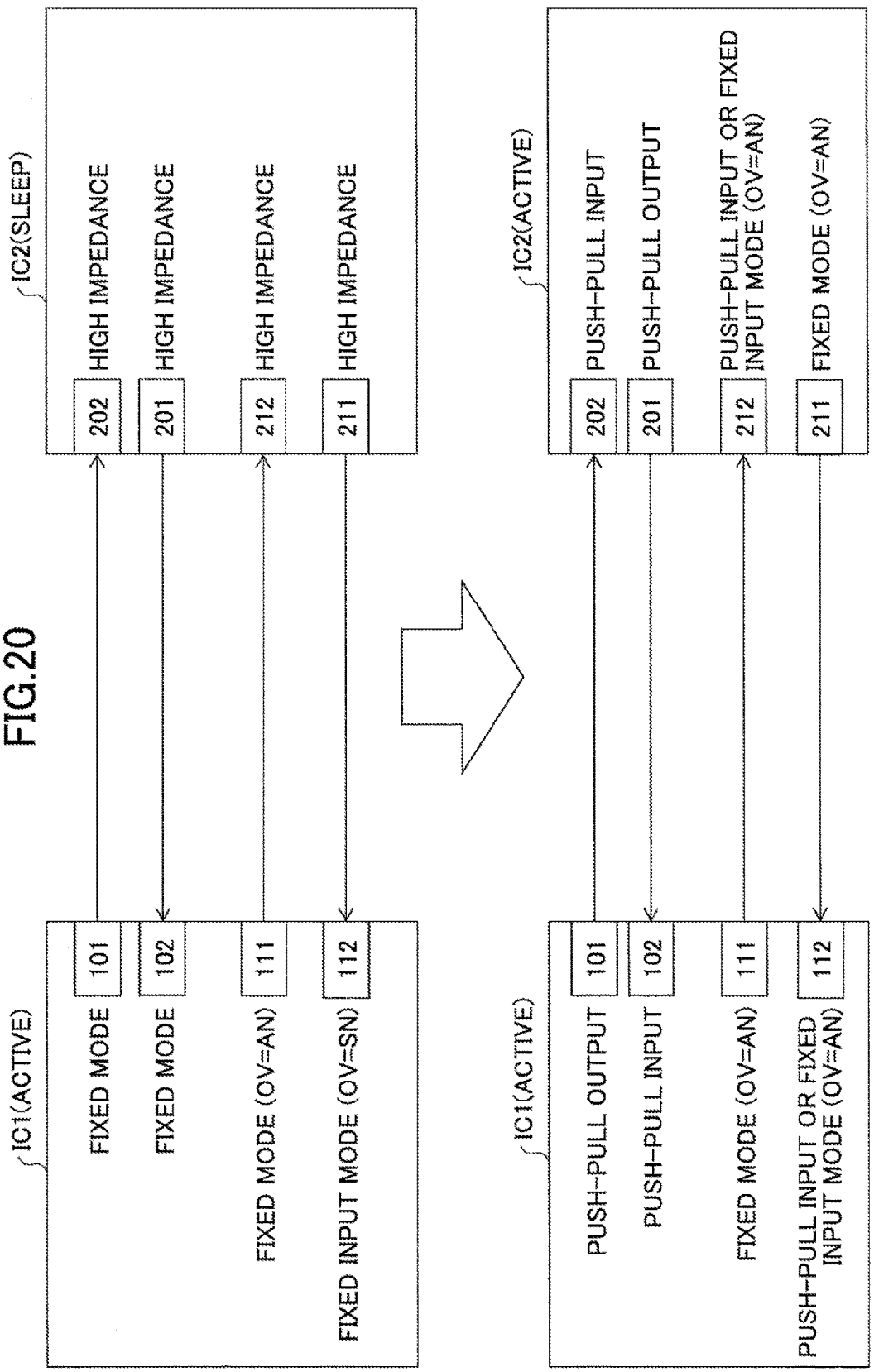
FIG. 20 is a drawing illustrating the case in which the second integrated circuit makes a transition to the active mode from the state in which the first integrated circuit and the second integrated circuit are in the active mode and the sleep mode, respectively.

FIG. 20 is a drawing illustrating the case in which the second integrated circuit IC2 makes a transition to the active mode from the state in which the first integrated circuit IC1 and the second integrated circuit IC2 are in the active mode and the sleep mode, respectively. With the second integrated circuit IC2 being in the sleep mode, the first I/O ports 101 and 102 of the first integrated circuit IC1 in the active mode are both in the signal-line-voltage fixed mode. Further, the first I/O port 111 is placed in the signal-line-voltage fixed mode (output voltage=active notification), and the first I/O port 112 is placed in the signal-line-voltage-fixed input mode (output voltage=sleep notification). The second integrated circuit IC2 in the sleep mode has the second I/O ports 201, 202, 211, and 212 in the high-impedance mode.

Subsequently, the second integrated circuit IC2 makes a transition to the active mode in response to an interrupt signal produced by the interrupt controller that has received a signal from the timer of FIG. 2 or some other peripheral circuit (not shown). Upon making a transition to the active mode, the second I/O ports 202 and 201 of the second integrated circuit IC2 are set to the push-pull input mode and the push-pull output mode, respectively. Further, the second I/O port 212 of the second integrated circuit IC2 is set to either the push-pull input mode or the signal-line-voltage-fixed input mode (output voltage=active notification), and the second I/O port 211 is set to the signal-line-voltage fixed mode (output voltage=active notification). In response to the active notification by the second notification signal from the second integrated circuit IC2, the first integrated circuit IC1 performs operations, as an interrupt operation, for example, to set the first I/O ports to the following signal input and output modes. The first I/O ports 101 and 102 of the first integrated circuit IC1 are set to the push-pull output mode and the push-pull input mode, respectively. Further, the first I/O port 111 is set to the signal-line-voltage fixed mode (output voltage=active notification), and the first I/O port 112 is set to either the push-pull input mode or the signal-line-voltage-fixed input mode (output voltage=active notification).

Prior to the transition of the second integrated circuit IC2 from the sleep mode to the active mode, the first I/O port 112 is placed in the signal-line-voltage-fixed input mode (output voltage=sleep notification), and the second I/O port 211 coupled thereto is placed in the high-impedance mode. Upon the transition of the second integrated circuit IC2 to the active mode, the second I/O port 211 for transmitting the second notification signal produces the voltage indicative of active notification, resulting in a steady current flowing between the second I/O port 211 and the first I/O port 112. Accordingly, upon detecting the transition of the second integrated circuit IC2 to the active mode based on the second notification signal, the first integrated circuit IC1 preferably sets the first I/O port 112 to the signal-line-voltage fixed mode (output voltage=active notification) without a delay. With this arrangement, a steady current flows only for an extremely short duration, avoiding the continuous flow of a steady current.

Figure 21:
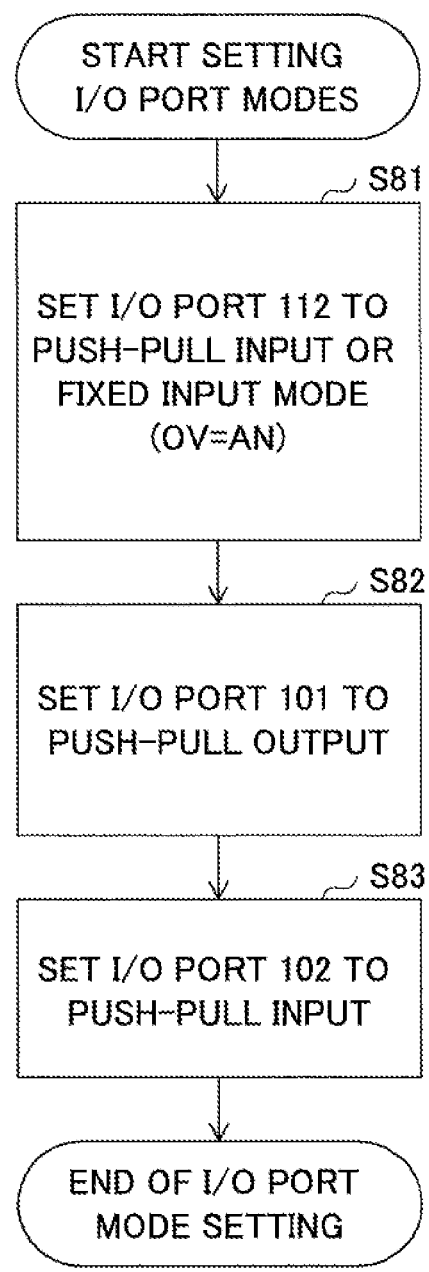
FIG. 21 is a flowchart illustrating the control procedure that is performed by the first integrated circuit to implement changes in the signal input and output modes illustrated in FIG. 20.

FIG. 21 is a flowchart illustrating the control procedure that is performed by the first integrated circuit IC1 to implement changes in the signal input and output modes illustrated in FIG. 20. The control circuit of the first integrated circuit IC1 (e.g., the CPU 10 of FIG. 1) may perform each step of the flowchart illustrated in FIG. 21.

Upon the second notification signal turning into the active notification voltage, the control circuit of the first integrated circuit IC1 performs the control processes specified by the flowchart of FIG. 21 as an interrupt process, for example. In step S81, the first integrated circuit IC1 sets the first I/O port 112 to either the push-pull input mode or the signal-line-voltage-fixed input mode (output voltage=active notification). In step S82, the first integrated circuit IC1 sets the first I/O port 101 to the push-pull output mode. In step S83, the first integrated circuit IC1 sets the first I/O port 102 to the push-pull input mode. With this, the control procedure by the first integrated circuit IC1 to set signal input and output modes comes to an end.

Figure 22:
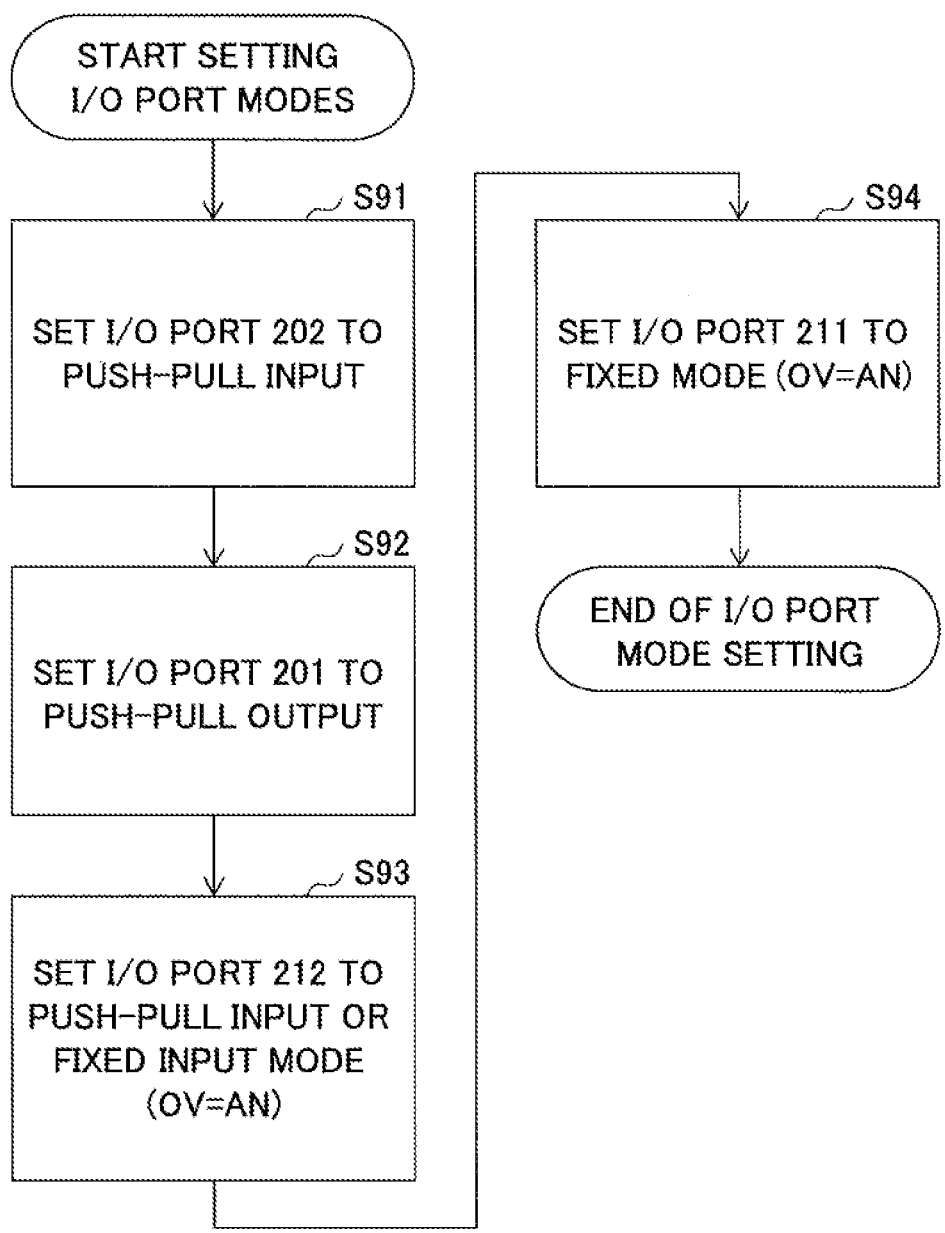
FIG. 22 is a flowchart illustrating the control procedure that is performed by the second integrated circuit to implement changes in the signal input and output modes illustrated in FIG. 20.

FIG. 22 is a flowchart illustrating the control procedure that is performed by the second integrated circuit IC2 to implement changes in the signal input and output modes illustrated in FIG. 20. The control circuit of the second integrated circuit IC2 (e.g., the CPU 10 of FIG. 2) may perform each step of the flowchart illustrated in FIG. 22.

Upon making a transition to the active mode, the control circuit of the second integrated circuit IC2 performs the control processes specified by the flowchart of FIG. 22. In step S91, the second integrated circuit IC2 sets the second I/O port 202 to the push-pull input mode. In step S92, the second integrated circuit IC2 sets the second I/O port 201 to the push-pull output mode. In step S93, the second integrated circuit IC2 sets the second I/O port 212 to either the push-pull input mode or the signal-line-voltage-fixed input mode (output voltage=active notification). In step S94, the second integrated circuit IC2 sets the second I/O port 211 to the signal-line-voltage fixed mode (output voltage=active notification). With this, the control procedure by the second integrated circuit IC2 to set signal input and output modes comes to an end.

Figure 23:
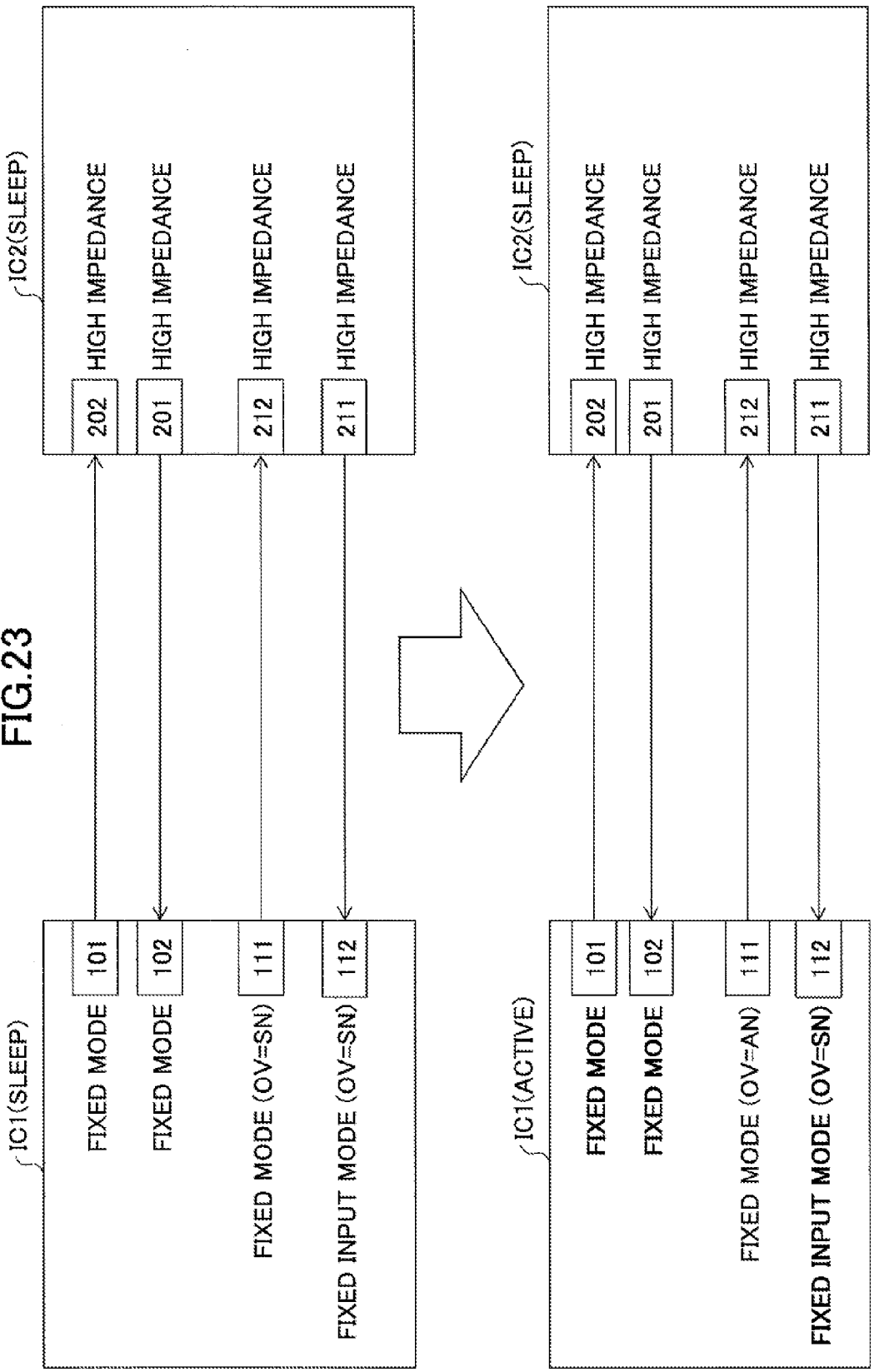
FIG. 23 is a drawing illustrating the case in which the first integrated circuit makes a transition to the active mode from the state in which both the first integrated circuit and the second integrated circuit are in the sleep mode.

FIG. 23 is a drawing illustrating the case in which the first integrated circuit IC1 makes a transition to the active mode from the state in which both the first integrated circuit IC1 and the second integrated circuit IC2 are in the sleep mode, in response to an interrupt signal supplied from the interrupt controller that has received a signal from the timer of FIG. 2 or from some other peripheral circuit (not shown) or a signal supplied through an I/O port from another IC such as the second integrated circuit IC2. The first I/O ports 101 and 102 of the first integrated circuit IC1 in the sleep mode are both in the signal-line-voltage fixed mode. Further, the first I/O port 111 is placed in the signal-line-voltage fixed mode (output voltage=sleep notification), and the first I/O port 112 is placed in the signal-line-voltage-fixed input mode (output voltage=sleep notification). The second integrated circuit IC2 in the sleep mode has the second I/O ports 201, 202, 211, and 212 in the high-impedance mode.

Subsequently, the first integrated circuit IC1 makes a transition to the active mode. Upon the transition to the active mode, the first integrated circuit IC1 sets the first I/O port 111 to the signal-line-voltage fixed mode (output voltage=active notification). It suffices for the remaining first I/O ports to maintain their signal input and output modes that were used prior to the mode transition.

Figure 24:
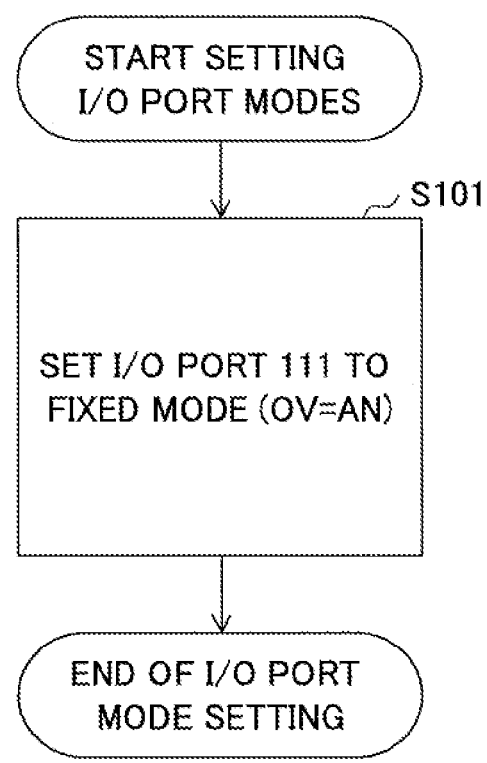
FIG. 24 is a flowchart illustrating the control procedure that is performed by the first integrated circuit to implement changes in the signal input and output modes illustrated in FIG. 23.

FIG. 24 is a flowchart illustrating the control procedure that is performed by the first integrated circuit IC1 to implement changes in the signal input and output modes illustrated in FIG. 23. The control circuit of the first integrated circuit IC1 (e.g., the CPU 10 of FIG. 1) may perform each step of the flowchart illustrated in FIG. 24.

Upon making a transition to the active mode, the control circuit of the first integrated circuit IC1 performs the control processes specified by the flowchart of FIG. 24. In step S101, the first integrated circuit IC1 sets the first I/O port 111 for transmitting the first notification signal to the signal-line-voltage fixed mode (output voltage=active notification). With this, the control procedure by the first integrated circuit IC1 to set signal input and output modes comes to an end.

Figure 25:
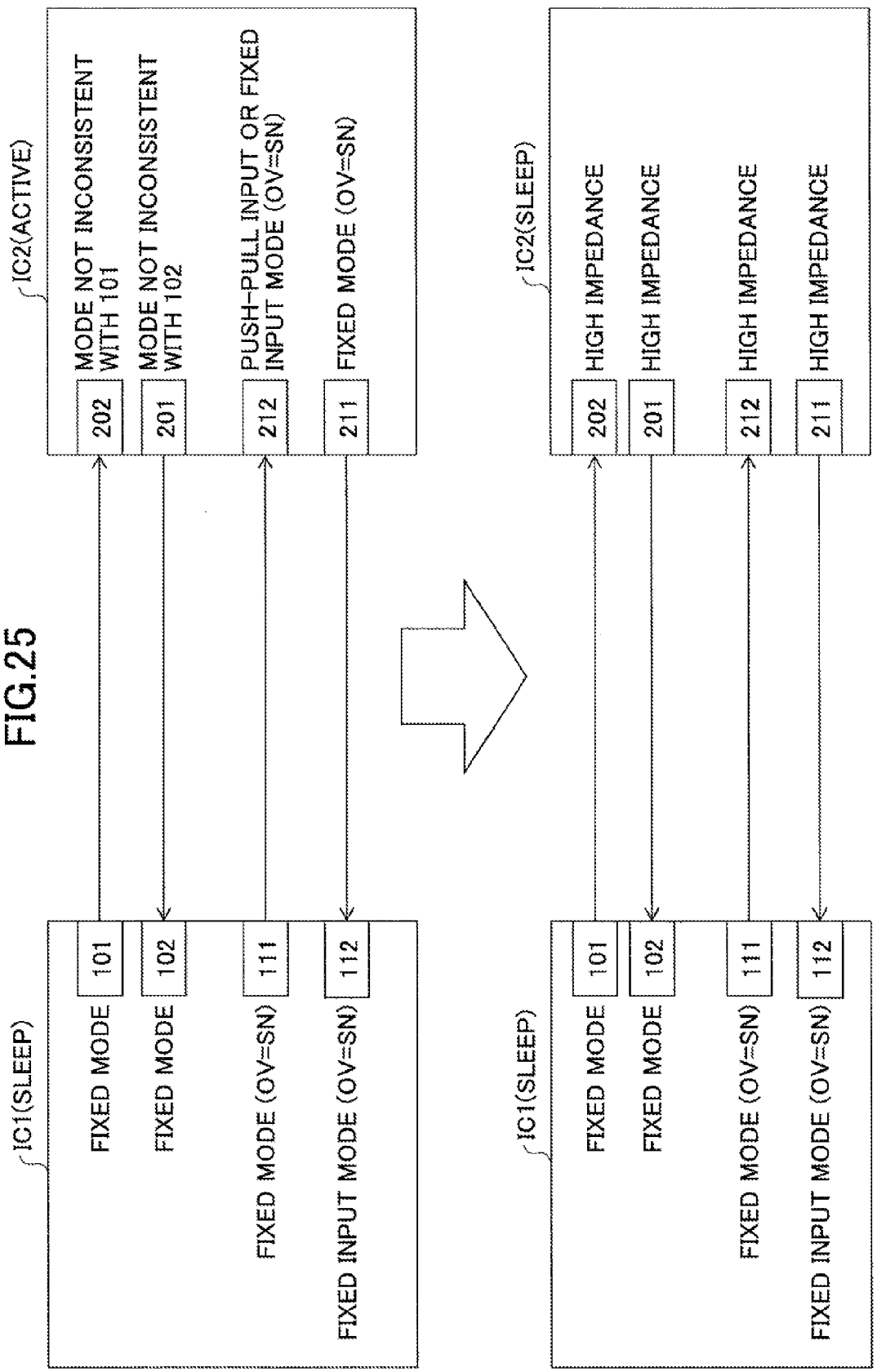
FIG. 25 is a drawing illustrating the case in which the second integrated circuit makes a transition to the sleep mode from the state in which the first integrated circuit and the second integrated circuit are in the sleep mode and the active mode, respectively.

FIG. 25 is a drawing illustrating the case in which the second integrated circuit IC2 makes a transition to the sleep mode from the state in which the first integrated circuit IC1 and the second integrated circuit IC2 are in the sleep mode and the active mode, respectively. The first I/O ports 101 and 102 of the first integrated circuit IC1 in the sleep mode are both in the signal-line-voltage fixed mode. Further, the first I/O port 111 is placed in the signal-line-voltage fixed mode (output voltage=sleep notification), and the first I/O port 112 is placed in the signal-line-voltage-fixed input mode (output voltage=sleep notification). In this state, the second I/O ports 202 and 201 of the second integrated circuit IC2 in the active mode are set to the modes that are not inconsistent with the signal input and output modes of the first I/O ports 101 and 102 of the first integrated circuit IC1, respectively. The second I/O port 212 for receiving the first notification signal is either in the push-pull input mode or in the signal-line-voltage-fixed input mode (output voltage=sleep notification). Further, the second I/O port 211 for transmitting a second notification signal is in the signal-line-voltage fixed mode (output voltage=sleep notification).

Subsequently, the second integrated circuit IC2 makes a transition to the sleep mode. As the second integrated circuit IC2 makes a transition to the sleep mode, the second I/O ports 201, 202, 211, and 212 are all set to the high-impedance mode. Since the first integrated circuit IC1 is in the sleep mode, the first I/O ports of the first integrated circuit IC1 exhibit no changes in the signal input and output modes thereof. It may be noted that, prior to the transition to the sleep mode, the second integrated circuit IC2 chooses not to change the second notification signal transmitted from the second I/O port 211 to the sleep notification voltage. This is because the second integrated circuit IC2, which is able to detect the sleep mode of the first integrated circuit IC1 based on the fact that the first notification signal is at the sleep notification voltage, ascertains that there is no need to notify the first integrated circuit IC1 of a mode transition.

Figure 26:
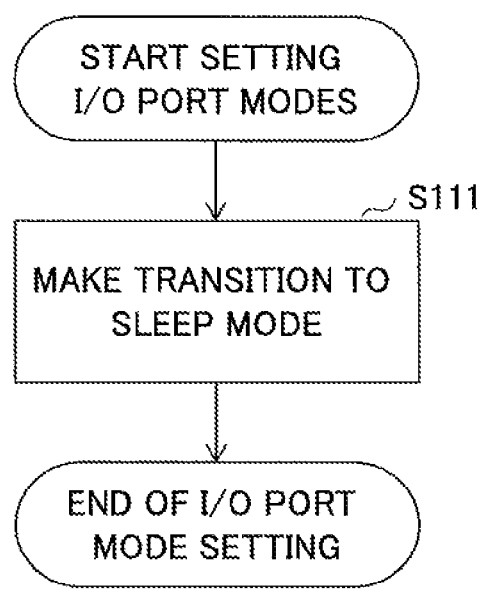
FIG. 26 is a flowchart illustrating the control procedure that is performed by the second integrated circuit IC2 to implement changes in the signal input and output modes illustrated in FIG. 25.

FIG. 26 is a flowchart illustrating the control procedure that is performed by the second integrated circuit IC2 to implement changes in the signal input and output modes illustrated in FIG. 25. The control circuit of the second integrated circuit IC2 (e.g., the CPU 10 of FIG. 2) may perform each step of the flowchart illustrated in FIG. 9.

At the time of making a transition to the sleep mode upon the completion of the active mode, the control circuit of the second integrated circuit IC2 performs the control processes specified by the flowchart of FIG. 9. In step S111, the second integrated circuit IC2 makes a transition to the sleep mode. The second integrated circuit IC2 having made a transition to the sleep mode has the second I/O ports 201, 202, 211, and 212 in the high-impedance mode. With this, the control procedure by the second integrated circuit IC2 to set signal input and output modes comes to an end.

The first integrated circuit IC1 in FIG. 14 may use a signal line extending from a second I/O port 201 of the second integrated circuit IC2 to a first I/O port 102 of the first integrated circuit IC1 for the purpose of receiving a signal that initiates a transition from the sleep mode to the active mode. In such a case, the first I/O ports 102 of the first integrated circuit IC1 and the second I/O ports 201 of the second integrated circuit IC2 are preferably set to the signal-line-voltage-fixed input mode and the push-pull output mode, respectively, thereby allowing a signal transmitted from the second I/O ports 201 to be received by the first I/O ports 102. A signal is transmitted from the second I/O port 201 placed in the push-pull output mode in order to generate an interrupt signal for causing the first integrated circuit IC1 to make a transition to the active mode. This transmitted signal is then received at the first I/O port 102 of the first integrated circuit IC1 placed in the signal-line-voltage-fixed input mode. Even in the push-pull input mode, the first I/O port 102 is able to receive a signal for interruption purposes supplied from the second I/O port 201. However, when the second integrated circuit IC2 makes a transition from the active mode to the sleep mode during the sleep mode of the first integrated circuit IC1, the high-impedance state of the second I/O port 201 causes a through current to flow at the first I/O port 102, thereby resulting in an undesirable increase in power consumption, as indicated by the combination of the push-pull input mode and the high-impedance mode in FIG. 5. The first I/O ports 102 are set to the signal-line-voltage-fixed input mode in step S2 of FIG. 8 and in step S62 of FIG. 18. The second I/O ports 202 are set to the push-pull output mode in step S31 of FIG. 13. Step S71 of FIG. 19 is unnecessary since the second I/O ports 202 are already placed in the push-pull output mode.

Further, although the present invention has been described with reference to the embodiments, the present invention is not limited to these embodiments, and various variations and modifications may be made without departing from the scope as defined in the claims.

According to one aspect, I/O ports are controlled such as to avoid the flow of needless currents through the I/O ports in the configuration in which a normal integrated circuit and a low power integrated circuit are connected to each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An integrated circuit system, comprising:
a first integrated circuit having a plurality of first I/O ports and configured to operate in an operation mode that is at least either an active mode or a sleep mode, the plurality of first I/O ports being configured to transmit or receive signals based on first signal modes which are set to the plurality of first I/O ports, the first signal modes set to the plurality of first I/O ports in the active mode being maintained in the sleep mode; and
a second integrated circuit having a plurality of second I/O ports coupled to the plurality of first I/O ports, and configured to operate in an operation mode that is at least either an active mode or a sleep mode, the plurality of second I/O ports being configured to transmit or receive signals based on second signal modes set to the plurality of second I/O ports, the second signal modes set to the plurality of second I/O ports in the active mode being not maintained in the sleep mode, and the plurality of second I/O ports being placed in a floating state in the sleep mode, wherein the first integrated circuit transmits, from one of the plurality of first I/O ports to the second integrated circuit, a first notification signal that indicates an operation mode of the first integrated circuit, the second integrated circuit transmits, from one of the plurality of second I/O ports to the first integrated circuit, a second notification signal that indicates an operation mode of the second integrated circuit, and in response to the received second notification signal and the received first notification signal, the first integrated circuit sets the first signal modes of the plurality of first I/O ports, and the second integrated circuit sets the second signal modes of the plurality of second I/O ports, to suppress steady currents persistently flowing between the first I/O ports and the second I/O ports, and to suppress through currents flowing at any one of the first I/O ports and the second I/O ports.

2. The integrated circuit system as claimed in claim 1, wherein the first signal modes and the second signal modes include a push-pull output mode, a push-pull input mode, a pullup input mode, a pulldown input mode, and a high-impedance mode.

3. The integrated circuit system as claimed in claim 1, wherein the first integrated circuit sets the first notification signal such that the first notification signal indicates the active mode while the first integrated circuit is in the active mode, and such that the first notification signal indicates the sleep mode immediately before the first integrated circuit makes a transition to the sleep mode upon a completion of the active mode, and the second integrated circuit sets the second notification signal such that the second notification signal indicates the sleep mode immediately before the second integrated circuit makes a transition to the sleep mode upon a completion of the active mode.

4. The integrated circuit system as claimed in claim 3, wherein immediately before the first integrated circuit makes a transition to the sleep mode upon a completion of the active mode, the first integrated circuit makes settings such that the one of the plurality of first I/O ports for transmitting the first notification signal is fixed to a voltage indicative of the sleep mode, such that one of the plurality of first I/O ports for receiving the second notification signal is placed in an input state and fixed to a voltage indicative of the sleep mode, and such that one or more remaining ones of the plurality of first I/O ports are fixed to a predetermined voltage.

5. The integrated circuit system as claimed in claim 4, wherein the second integrated circuit in the active mode sets the second notification signal to a voltage indicative of the sleep mode during a reception of the first notification signal indicative the sleep mode of the first integrated circuit, and sets the second notification signal to a voltage indicative of the active mode during a reception of the first notification signal indicative of the active mode of the first integrated circuit.

6. An integrated circuit for operating in an operation mode that is at least either an active mode or a sleep mode, comprising:

a plurality of I/O ports configured to transmit or receive signals based on signal modes which are set to the plurality of I/O ports; and a control circuit configured to set, in the active mode, the signal modes of the plurality of I/O ports, wherein the signal modes set to the plurality of I/O ports in the active mode are maintained in the sleep mode, wherein a first notification signal that indicates an operation mode is transmitted to an outside through one of the plurality of I/O ports, wherein a second notification signal that indicates an operation mode of another integrated circuit is received through one of the plurality of I/O ports, wherein the control circuit sets the signal modes of the plurality of I/O ports based on the second notification signal to suppress steady currents persistently flowing between the plurality of I/O ports and said another integrated circuit, and to suppress through currents flowing at the plurality of I/O ports, and wherein in a case of the second notification signal indicating a transition of said another integrated circuit to a sleep mode, the control circuit sets the plurality of I/O ports to a push-pull output mode, a pullup input mode, or a pulldown input mode.

7. The integrated circuit as claimed in claim 6, wherein immediately before a transition to the sleep mode upon a completion of the active mode, the control circuit makes settings such that the one of the plurality of I/O ports for transmitting the first notification signal is fixed to a voltage indicative of the sleep mode, such that the one of the plurality of I/O ports for receiving the second notification signal is placed in an input state and fixed to a voltage indicative of the sleep mode, and such that one or more remaining ones of the plurality of I/O ports are fixed to a predetermined voltage.

8. An integrated circuit for operating in an operation mode that is at least either an active mode or a sleep mode, comprising:

a plurality of I/O ports configured to transmit or receive signals based on signal modes which are set to the plurality of I/O ports; and a control circuit configured to set, in the active mode, the signal modes of the plurality of I/O ports, wherein the signal modes set to the plurality of I/O ports in the active mode are not maintained in the sleep mode, and the plurality of I/O ports are placed in a floating state in the sleep mode, wherein a first notification signal that indicates an operation mode of another integrated circuit is received through one of the plurality of I/O ports, wherein a second notification signal that indicates an operation mode is transmitted to an outside through one of the plurality of I/O ports, wherein the control circuit sets the signal modes of the plurality of I/O ports based on the second notification signal to suppress steady currents persistently flowing between the plurality of I/O ports and said another integrated circuit, and to suppress through currents flowing at the plurality of I/O ports, and wherein the control circuit transmits the second notification signal indicative of the sleep mode to an outside when a transition is made from the active mode to the sleep mode.

9. The integrated circuit as claimed in claim 8, wherein the control circuit sets the second notification signal to a voltage indicative of the sleep mode during a reception of the first notification signal indicative the sleep mode of said another integrated circuit, and sets the second notification signal to a voltage indicative of the active mode during a reception of the first notification signal indicative of the active mode of said another integrated circuit.

* * * * *